(12) United States Patent
Reitmeyer et al.

(10) Patent No.: US 11,936,923 B1
(45) Date of Patent: *Mar. 19, 2024

(54) SYSTEM AND METHOD FOR TRANSCODING MEDIA STREAM

(71) Applicant: RESI MEDIA LLC, Plano, TX (US)

(72) Inventors: Bradley Reitmeyer, Allen, TX (US); Paul Martel, Richardson, TX (US); Christopher Joel Ribble, Garland, TX (US)

(73) Assignee: RESI MEDIA LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,033

(22) Filed: Jul. 5, 2022

Related U.S. Application Data

(63) Continuation of application No. 17/656,196, filed on Mar. 23, 2022, now Pat. No. 11,405,665, which is a (Continued)

(51) Int. Cl.
*H04N 21/2343* (2011.01)
*H04L 65/75* (2022.01)
(Continued)

(52) U.S. Cl.
CPC ....... *H04N 21/2187* (2013.01); *H04L 65/765* (2022.05); *H04N 21/234309* (2013.01); (Continued)

(58) Field of Classification Search
CPC ........... H04N 21/2187; H04N 21/2365; H04N 21/2743; H04N 21/432; H04N 21/440218; (Continued)

(56) References Cited

U.S. PATENT DOCUMENTS

| 6,389,473 | B1 | 5/2002 | Carmel et al. |
| 7,047,309 | B2 | 5/2006 | Baumann et al. |

(Continued)

FOREIGN PATENT DOCUMENTS

| CN | 106791932 A | 5/2017 |
| KR | 20050068108 A | 7/2005 |

OTHER PUBLICATIONS

"U.S. Appl. No. 15/252,368, Notice of Allowance dated Jan. 27, 2017", 11 pgs.
(Continued)

*Primary Examiner* — John R Schnurr
(74) *Attorney, Agent, or Firm* — Schwegman Lundberg & Woessner, P.A.

(57) ABSTRACT

A system for transcoding a media stream includes at least one network interface; at least one memory; and at least one processor each coupled to one or more of the at least one network interface and one or more of the at least one memory. The at least one processor is configured to publish, via a messaging bus, a segment transcode request in a segment transcode request queue, retrieve the segment transcode request by a transcode worker thread, wherein the first transcode worker thread monitors the segment transcode request queue, transcode by a second transcode worker thread a segment referenced by the segment transcode request, determine by the manifest processor whether the second transcode worker thread has completed transcoding the segment and is still operating, and, if not, transcode the segment by a third transcode worker thread, and store the transcoded segment.

12 Claims, 19 Drawing Sheets

Related U.S. Application Data continuation of application No. 17/198,307, filed on Mar. 11, 2021, now Pat. No. 11,405,661, which is a continuation of application No. 16/710,660, filed on Dec. 11, 2019, now Pat. No. 10,951,925, which is a continuation of application No. 16/017,474, filed on Jun. 25, 2018, now Pat. No. 10,511,864, which is a continuation-in-part of application No. 15/944,312, filed on Apr. 3, 2018, now Pat. No. 10,327,013, which is a continuation of application No. 15/462,816, filed on Mar. 18, 2017, now Pat. No. 9,936,228, which is a continuation of application No. 15/252,368, filed on Aug. 31, 2016, now Pat. No. 9,602,846.

(51) Int. Cl.
| | |
|---|---|
| *H04N 21/2187* | (2011.01) |
| *H04N 21/2365* | (2011.01) |
| *H04N 21/2743* | (2011.01) |
| *H04N 21/432* | (2011.01) |
| *H04N 21/4402* | (2011.01) |
| *H04N 21/6334* | (2011.01) |
| *H04N 21/6377* | (2011.01) |
| *H04N 21/845* | (2011.01) |

(52) U.S. Cl.
CPC ..... *H04N 21/2365* (2013.01); *H04N 21/2743* (2013.01); *H04N 21/432* (2013.01); *H04N 21/440218* (2013.01); *H04N 21/63345* (2013.01); *H04N 21/63775* (2013.01); *H04N 21/8456* (2013.01)

(58) Field of Classification Search
CPC ....... H04N 21/63345; H04N 21/63775; H04N 21/8456; H04L 65/765
See application file for complete search history.

(56) References Cited

U.S. PATENT DOCUMENTS

| | | | |
|---|---|---|---|
| 8,223,766 | B2 | 7/2012 | Matsumoto et al. |
| 8,285,867 | B1 | 10/2012 | Edelman et al. |
| 8,396,960 | B2 | 3/2013 | Martinez et al. |
| 8,762,642 | B2 | 6/2014 | Bates et al. |
| 8,935,432 | B1 | 1/2015 | Mcgowan et al. |
| 9,167,275 | B1 | 10/2015 | Daily et al. |
| 9,602,846 | B1 | 3/2017 | Martel et al. |
| 9,686,574 | B2 | 6/2017 | Daily et al. |
| 9,912,710 | B2 | 3/2018 | Duerring |
| 9,936,228 | B2 | 4/2018 | Martel et al. |
| 10,154,317 | B2 | 12/2018 | Daily et al. |
| 10,200,729 | B2 | 2/2019 | Daily et al. |
| 10,327,013 | B2 | 6/2019 | Martel et al. |
| 10,511,864 | B2 | 12/2019 | Reitmeyer et al. |
| 10,951,925 | B2 | 3/2021 | Reitmeyer et al. |
| 11,044,503 | B1 | 6/2021 | Daily et al. |
| 11,405,661 | B2 | 8/2022 | Reitmeyer et al. |
| 11,405,665 | B1* | 8/2022 | Reitmeyer ............ H04L 65/765 |
| 11,412,272 | B2 | 8/2022 | Reitmeyer et al. |
| 11,736,739 | B2 | 8/2023 | Reitmeyer et al. |
| 2003/0079222 | A1 | 4/2003 | Boykin et al. |
| 2004/0215718 | A1 | 10/2004 | Kazmi et al. |
| 2004/0255335 | A1 | 12/2004 | Fickle et al. |
| 2006/0159098 | A1 | 7/2006 | Munson et al. |
| 2007/0050834 | A1 | 3/2007 | Royo et al. |
| 2009/0003600 | A1 | 1/2009 | Chen et al. |
| 2009/0037967 | A1 | 2/2009 | Barkan et al. |
| 2009/0094652 | A1 | 4/2009 | Al et al. |
| 2009/0210915 | A1 | 8/2009 | Millman et al. |
| 2011/0069750 | A1 | 3/2011 | Chengalvala et al. |
| 2011/0211036 | A1 | 9/2011 | Tran |
| 2011/0252118 | A1 | 10/2011 | Pantos et al. |
| 2012/0110609 | A1 | 5/2012 | Guo et al. |
| 2012/0158802 | A1 | 6/2012 | Lakshmanan et al. |
| 2012/0311094 | A1 | 12/2012 | Biderman et al. |
| 2013/0117418 | A1 | 5/2013 | Mutton et al. |
| 2013/0125153 | A1* | 5/2013 | Hilson ............... H04N 21/2393 725/32 |
| 2013/0276048 | A1* | 10/2013 | Krasic ................ H04N 21/2187 725/116 |
| 2013/0308440 | A1 | 11/2013 | Grossman |
| 2014/0038535 | A1 | 2/2014 | Bingham |
| 2014/0119457 | A1 | 5/2014 | Macinnis et al. |
| 2014/0139733 | A1 | 5/2014 | Macinnis et al. |
| 2014/0165118 | A1 | 6/2014 | Garcia et al. |
| 2014/0165120 | A1 | 6/2014 | Losev et al. |
| 2014/0189761 | A1 | 7/2014 | Sood et al. |
| 2014/0321554 | A1 | 10/2014 | Cheung et al. |
| 2014/0337903 | A1 | 11/2014 | Zhu et al. |
| 2015/0201042 | A1 | 7/2015 | Shah et al. |
| 2015/0208103 | A1 | 7/2015 | Guntur et al. |
| 2015/0244757 | A1 | 8/2015 | Zhuang et al. |
| 2015/0249845 | A1 | 9/2015 | Tirosh et al. |
| 2015/0296274 | A1 | 10/2015 | Good et al. |
| 2015/0350711 | A1 | 12/2015 | Guzik |
| 2016/0050453 | A1 | 2/2016 | Cottrell et al. |
| 2016/0080807 | A1 | 3/2016 | Trimper et al. |
| 2016/0088322 | A1* | 3/2016 | Horev ................ H04N 21/2402 725/14 |
| 2016/0119679 | A1 | 4/2016 | Randall et al. |
| 2016/0127440 | A1 | 5/2016 | Gordon |
| 2016/0142752 | A1 | 5/2016 | Ohno et al. |
| 2016/0316235 | A1 | 10/2016 | Van Veldhuisen |
| 2016/0359817 | A1 | 12/2016 | Mullen et al. |
| 2017/0006253 | A1 | 1/2017 | Martin |
| 2017/0026311 | A1 | 1/2017 | Wang et al. |
| 2017/0126775 | A1 | 5/2017 | Schwebke et al. |
| 2018/0063557 | A1 | 3/2018 | Martel et al. |
| 2018/0091827 | A1 | 3/2018 | Chou et al. |
| 2018/0146222 | A1 | 5/2018 | Soroushian |
| 2018/0227602 | A1 | 8/2018 | Martel et al. |
| 2018/0288451 | A1 | 10/2018 | Asif et al. |
| 2018/0310032 | A1 | 10/2018 | Reitmeyer et al. |
| 2019/0140978 | A1 | 5/2019 | Babcock et al. |
| 2021/0289234 | A1 | 9/2021 | Reitmeyer et al. |
| 2021/0297709 | A1 | 9/2021 | Reitmeyer et al. |
| 2022/0394313 | A1 | 12/2022 | Reitmeyer et al. |

OTHER PUBLICATIONS

"U.S. Appl. No. 15/462,816, Corrected Notice of Allowability dated Jan. 12, 2018", 2 pgs.

"U.S. Appl. No. 15/462,816, Non Final Office Action dated Jul. 31, 2017", 7 pgs.

"U.S. Appl. No. 15/462,816, Notice of Allowance dated Nov. 21, 2017", 9 pgs.

"U.S. Appl. No. 15/462,816, Response filed Oct. 31, 2017 to Non Final Office Action dated Jul. 31, 2017", 8 pgs.

"U.S. Appl. No. 15/944,312, Non Final Office Action dated Aug. 28, 2018", 9 pgs.

"U.S. Appl. No. 15/944,312, Notice of Allowance dated Feb. 6, 2019", 8 pgs.

"U.S. Appl. No. 15/944,312, Response filed Dec. 28, 2018 to Non Final Office Action dated Aug. 28, 2018", 11 pgs.

"U.S. Appl. No. 16/017,474, 312 Amendment filed Sep. 13, 2019", 10 pgs.

"U.S. Appl. No. 16/017,474, Notice of Allowance dated Aug. 6, 2019", 11 pgs.

"U.S. Appl. No. 16/017,474, PTO Response to Rule 312 Communication dated Oct. 10, 2019", 2 pgs.

"U.S. Appl. No. 17/198,307, Corrected Notice of Allowability dated Jun. 17, 2022", 2 pgs.

"U.S. Appl. No. 17/198,307, Corrected Notice of Allowability dated Jun. 30, 2022", 2 pgs.

"U.S. Appl. No. 17/198,307, Non Final Office Action dated Oct. 18, 2021", 8 pgs.

"U.S. Appl. No. 17/198,307, Notice of Allowance dated Mar. 11, 2022", 8 pgs.

(56) References Cited

OTHER PUBLICATIONS

"U.S. Appl. No. 17/198,307, Response filed Feb. 17, 2022 to Non Final Office Action dated Oct. 18, 2021", 15 pgs.
"U.S. Appl. No. 17/206,250, Corrected Notice of Allowability dated Jun. 20, 2022", 2 pgs.
"U.S. Appl. No. 17/206,250, Corrected Notice of Allowability dated Jun. 30, 2022", 2 pgs.
"U.S. Appl. No. 17/206,250, Examiner Interview Summary dated Mar. 29, 2022", 2 pgs.
"U.S. Appl. No. 17/206,250, Non Final Office Action dated Jan. 25, 2022", 13 pgs.
"U.S. Appl. No. 17/206,250, Notice of Allowance dated May 13, 2022", 9 pgs.
"U.S. Appl. No. 17/206,250, Response filed Apr. 25, 2022 to Non Final Office Action dated Jan. 25, 2022", 15 pgs.
"U.S. Appl. No. 17/656,196, Examiner Interview Summary dated Jun. 1, 2022", 2 pgs.
"U.S. Appl. No. 17/656,196, Non Final Office Action dated May 13, 2022", 11 pgs.
"U.S. Appl. No. 17/656,196, Notice of Allowance dated Jun. 10, 2022", 8 pgs.
"U.S. Appl. No. 17/844,698, Preliminary Amendment filed Aug. 19, 2022".
"Delivering Live YouTube Content via DASH", <https://developers.google.com/youtube/v3/live/guides/needing-with-dash>, (May 26, 2016), 15 pgs.
Hashimoto, K., et al., "Extended Video Stream by Media Transcoding Function", 24th International Conference on Distributed Computing Systems Workshops (ICDCSW'04), (2004), 6 pgs.
Jin, Y., et al., "Optimal Transcoding and Caching for Adaptive Streaming in Media Cloud: an Analytical Approach", IEEE Transactions on Circuits and Systems for Video Technology, vol. 25, No. 2, (Dec. 2015), 1914-1925.
Pantos, R., "HTTP Live Streaming draft-pantos-http-live-streaming-19", (Apr. 4, 2016), 54 pgs.
U.S. Appl. No. 17/656,196 U.S. Pat. No. 11,405,665, filed Mar. 23, 2022, System and Method for Transcoding Media Stream.
U.S. Appl. No. 15/252,368 U.S. Pat. No. 9,602,846, filed Aug. 31, 2016, System and Method for Asynchronous Uploading of Live Digital Multimedia With Guaranteed Delivery.
U.S. Appl. No. 15/462,816 U.S. Pat. No. 9,936,228, filed Mar. 18, 2017, System and Method for Asynchronous Uploading of Live Digital Multimedia With Guaranteed Delivery.
U.S. Appl. No. 15/944,312 U.S. Pat. No. 10,327,013, filed Apr. 3, 2018, System and Method for Asynchronous Uploading of Live Digital Multimedia With Guaranteed Delivery.
U.S. Appl. No. 17/206,250 U.S. Pat. No. 11,412,272, filed Mar. 19, 2021, System and Method for Converting Adaptive Stream to Downloadable Media.
U.S. Appl. No. 16/017,474 U.S. Pat. No. 10,511,864, filed Jun. 25, 2018, System and Method for Transcoding Media Stream.
U.S. Appl. No. 16/710,660 U.S. Pat. No. 10,951,925, filed Dec. 11, 2019, System and Method for Transcoding Media Stream.
U.S. Appl. No. 17/198,307 U.S. Pat. No. 11,405,661, filed Mar. 11, 2021, System and Method for Transcoding Media Stream.
U.S. Appl. No. 17/844,698, filed Jun. 20, 2022, System and Method for Transcoding Media Stream.
U.S. Appl. No. 17/656,196, filed Mar. 23, 2022, System and Method for Transcoding Media Stream.
U.S. Appl. No. 15/252,368 U.S. Pat. No. 9,602,846, filed Aug. 31, 2016, System and Method for Asynchronous Uploading of Live Digital Mulitmedia With Guaranteed Delivery.
U.S. Appl. No. 15/462,816 U.S. Pat. No. 9,936,228, filed Mar. 18, 2017, System and Method for Asynchronous Uploading of Live Digital Mulitmedia With Guaranteed Delivery.
U.S. Appl. No. 15/944,312 U.S. Pat. No. 10,327,013, filed Apr. 3, 2018, System and Method for Asynchronous Uploading of Live Digital Mulitmedia With Guaranteed Delivery.
U.S. Appl. No. 17/844,698, Corrected Notice of Allowability dated Apr. 20, 2023, 2 pgs.
U.S. Appl. No. 17/844,698, Non Final Office Action dated Jan. 13, 2023, 9 pgs.
U.S. Appl. No. 17/844,698, Notice of Allowance dated Apr. 17, 2023, 8 pgs.
U.S. Appl. No. 17/844,698, Response filed Mar. 31, 2023 to Non Final Office Action dated Jan. 13, 2023, 10 pgs.

* cited by examiner

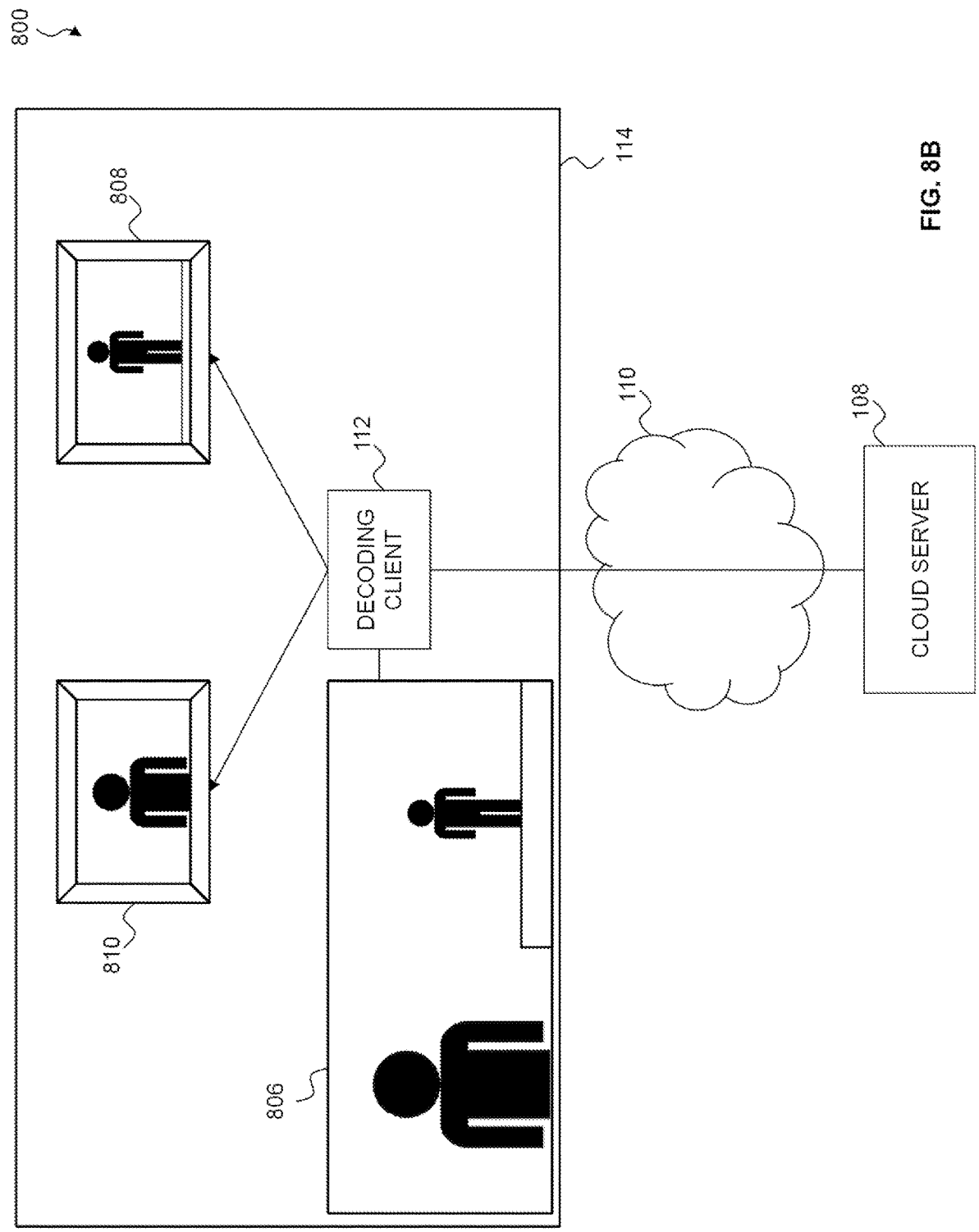

SYSTEM AND METHOD FOR TRANSCODING MEDIA STREAM

CROSS-REFERENCE TO RELATED APPLICATIONS

This application is a Continuation of U.S. patent application Ser. No. 17/656,196 filed Mar. 23, 2022 entitled SYSTEM AND METHOD FOR TRANSCODING MEDIA STREAM, which is a Continuation of U.S. patent application Ser. No. 17/198,307 filed Mar. 11, 2021 entitled SYSTEM AND METHOD FOR TRANSCODING MEDIA STREAM, which is a Continuation of U.S. patent application Ser. No. 16/710,660, filed Dec. 11, 2019, entitled SYSTEM AND METHOD FOR TRANSCODING MEDIA STREAM, issued as U.S. Pat. No. 10,951,925 on Mar. 16, 2021. U.S. patent application Ser. No. 16/710,660 is a Continuation of U.S. patent application Ser. No. 16/017,474, filed Jun. 25, 2018, entitled SYSTEM AND METHOD FOR TRANSCODING MEDIA STREAM, issued as U.S. Pat. No. 10,511,864 on Dec. 17, 2019. U.S. patent application Ser. No. 16/017,474 is a Continuation-In-Part of U.S. patent application Ser. No. 15/944,312, filed on Apr. 3, 2018, and entitled SYSTEM AND METHOD FOR ASYNCHRONOUS UPLOADING OF LIVE DIGITAL MULTIMEDIA WITH GUARANTEED DELIVERY, issued as U.S. Pat. No. 10,327,013 on Jun. 18, 2019. U.S. patent application Ser. No. 15/944,312 is a Continuation of U.S. patent application Ser. No. 15/462,816, filed on Mar. 18, 2017, and entitled SYSTEM AND METHOD FOR ASYNCHRONOUS UPLOADING OF LIVE DIGITAL MULTIMEDIA WITH GUARANTEED DELIVERY, issued as U.S. Pat. No. 9,936,228 on Apr. 3, 2018. U.S. patent application Ser. No. 15/462,816 is a continuation of U.S. patent application Ser. No. 15/252,368, filed on Aug. 31, 2016, and entitled SYSTEM AND METHOD FOR ASYNCHRONOUS UPLOADING OF LIVE DIGITAL MULTIMEDIA WITH GUARANTEED DELIVERY, issued as U.S. Pat. No. 9,602,846 on Mar. 21, 2017. U.S. patent application Ser. Nos. 17/656,196, 17/198,307, 16/710,660, 16/017,474, 15/944,312, 15/462,816 and 15/252,368, and U.S. Pat. Nos. 10,951,925, 10,511,864, 10,327,013, 9,936,228, and 9,602,846 are incorporated by reference herein in their entirety.

TECHNICAL FIELD

This disclosure relates to transcoding media for streaming, and more specifically to a system and method for transcoding a media stream.

BACKGROUND

Streaming live digital multimedia may result in a lower quality playback experience for end users because any issue with the upload process (from encoder to media server) may result in missing, incomplete, or degraded content. This defective content is then transmitted to end users in the same defective state, even when using a distribution network. This issue may be accepted by some end users because those end users might prefer to view the content as close to realtime as possible. However, some end users prefer for the content to be high quality and gapless upon viewing, and will therefore accept a higher latency (time delay) when viewing the live content. In addition, adaptive bitrate streaming allows for end users to receive content according to their available bandwidth.

SUMMARY

In one aspect thereof, a system for transcoding a media stream is provided. The system includes at least one network interface, at least one memory, and at least one processor each coupled to one or more of the at least one network interface and one or more of the at least one memory. The at least one processor is configured to initialize one or more manifest processors, initialize a plurality of transcode worker threads, publish, via a messaging bus, a transcode request in a transcode request queue, wherein the transcode request includes one or more transcode request parameters, wherein the messaging bus and the transcode request queue are provided by a messaging service, and wherein the messaging service provides communications distributed over the messaging bus across the system. The at least one processor is further configured to retrieve by a manifest processor the transcode request from the transcode request queue, publish, by the manifest processor via the messaging bus, a segment transcode request in a segment transcode request queue, wherein the segment transcode request queue is provided by the messaging service, retrieve the segment transcode request by a first transcode worker thread, wherein each one of the plurality of transcode worker threads are configured to monitor the segment transcode request queue or independently perform transcoding operations on segments, transcode by a second transcode worker thread a segment referenced by the segment transcode request in accordance with the one or more transcode request parameters, determine by the manifest processor whether the transcode worker thread has completed transcoding the segment and is still operating, and, if not, return, via the messaging bus, the segment transcode request to the segment transcode request queue, and transcode the segment by a third transcode worker thread, and store the transcoded segment.

In one embodiment, the at least one processor is further configured to retrieve a manifest referenced by the transcode request, and parse the manifest by the manifest processor to locate the segment and include a location of the segment in the segment transcode request.

In another embodiment, the at least one processor is further configured to publish, by the second or third transcode worker thread via the messaging bus, a segment transcode notification in a segment transcode notification queue, wherein the segment transcode notification indicates a successful transcode of the segment, and wherein the segment transcode notification queue is provided by the messaging service, and merge the segment transcode notification with any other segment transcode notifications in the segment transcode notification queue.

In another embodiment, the at least one processor is further configured to start a time interval, retrieve by the manifest processor the segment transcode notification or a merged notification from the segment transcode notification queue, in response to an expiration of the time interval, and create by the manifest processor a new manifest including information related to the transcoded segment and other segments referenced by the merged notification.

In another embodiment, the at least one processor is further configured to assign a unique identifier (UID) to a media stream, wherein the manifest and the segment are associated with the media stream, and reference the UID in the transcode request, the segment transcode request, and the segment transcode notification.

In another embodiment, when determining by the manifest processor whether the second transcode worker thread has completed transcoding the segment and is still operating, the at least one processor is further configured to place the segment transcode request in a transcode reattempt queue, wherein the transcode reattempt queue is a separate queue from the segment transcode request queue, wherein the transcode reattempt queue is provided by the messaging service, and wherein available transcode worker threads monitor the transcode reattempt queue in order to retrieve requests from the transcode reattempt queue and transcode segments referenced by segment transcode requests in the transcode reattempt queue.

In another embodiment, the one or more transcode request parameters include at least one of a resolution parameter, wherein the resolution parameter indicates a resolution at which to transcode the segment, a bitrate parameter, wherein the bitrate parameter indicates a bitrate to assign to the segment, a cropping parameter, wherein the cropping parameter indicates that images in the segment are to be cropped, a resizing parameter, wherein the resizing parameter indicates that a length of the segment is to be altered, or a codec parameter, wherein the codec parameter indicates that the segment is to be transcoded to a different codec.

In another aspect thereof, a method for transcoding a media stream is provided. The method includes initializing one or more manifest processors, initializing a plurality of transcode worker threads, publishing, via a messaging bus, a transcode request in a transcode request queue, wherein the transcode request includes one or more transcode request parameters, and wherein the messaging bus and the transcode request queue are provided by a messaging service, and wherein the messaging service provides communications distributed over the messaging bus, retrieving by a manifest processor the transcode request from the transcode request queue, publishing, by the manifest processor via the messaging bus, a segment transcode request in a segment transcode request queue, wherein the segment transcode request queue is provided by the messaging service, retrieving the segment transcode request by a first transcode worker thread, wherein each one of the plurality of transcode worker threads are configured to monitor the segment transcode request queue or independently perform transcoding operations on segments, transcoding by a second transcode worker thread a segment referenced by the segment transcode request in accordance with the one or more transcode request parameters, determine by the manifest processor whether the second transcode worker thread has completed transcoding the segment and is still operating, and, if not, returning, via the messaging bus, the segment transcode request to the segment transcode request queue, and transcoding the segment by a third transcode worker thread, and storing the transcoded segment.

In one embodiment, the method further includes retrieving a manifest referenced by the transcode request, and parsing the manifest by the manifest processor to locate the segment and include a location of the segment in the segment transcode request.

In another embodiment, the method further includes publishing, by the second or third transcode worker thread via the messaging bus, a segment transcode notification in a segment transcode notification queue, wherein the segment transcode notification indicates a successful transcode of the segment, and wherein the segment transcode notification queue is provided by the messaging service, and merging the segment transcode notification with any other segment transcode notifications in the segment transcode notification queue.

In another embodiment, the method further includes starting a time interval, retrieving by the manifest processor the segment transcode notification or a merged notification from the segment transcode notification queue, in response to an expiration of the time interval, and creating by the manifest processor a new manifest including information related to the transcoded segment and other segments referenced by the merged notification.

In another embodiment, the method further includes assigning a unique identifier (UID) to a media stream, wherein the manifest and the segment are associated with the media stream, and referencing the UID in the transcode request, the segment transcode request, and the segment transcode notification.

In another embodiment, the method further includes when determining by the manifest processor whether the second transcode worker thread has completed transcoding the segment and is still operating, placing the segment transcode request in a transcode reattempt queue, wherein the transcode reattempt queue is a separate queue from the segment transcode request queue, wherein the transcode reattempt queue is provided by the messaging service, and wherein available transcode worker threads monitor the transcode reattempt queue in order to retrieve requests from the transcode reattempt queue and transcode segments referenced by segment transcode requests in the transcode reattempt queue.

In another embodiment, the method further includes the one or more transcode request parameters include at least one of a resolution parameter, wherein the resolution parameter indicates a resolution at which to transcode the segment, a bitrate parameter, wherein the bitrate parameter indicates a bitrate to assign to the segment, a cropping parameter, wherein the cropping parameter indicates that images in the segment are to be cropped, a resizing parameter, wherein the resizing parameter indicates that a length of the segment is to be altered, or a codec parameter, wherein the codec parameter indicates that the segment is to be transcoded to a different codec.

In another aspect thereof, a non-transitory computer readable medium comprising instructions for operating a system including at least one network interface, at least one memory, and at least one processor is provided. The instructions, when executed by the at least one processor, cause the system to initialize one or more manifest processors, initialize a plurality of transcode worker threads, publish, via a messaging bus, a transcode request in a transcode request queue, wherein the transcode request includes one or more transcode request parameters, wherein the messaging bus and the transcode request queue are provided by a messaging service, and wherein the messaging service provides communications distributed over the messaging bus across the system, retrieve by a manifest processor the transcode request from the transcode request queue, publish, by the manifest processor via the messaging bus, a segment transcode request in a segment transcode request queue, wherein the segment transcode request queue is provided by the messaging service, retrieve the segment transcode request by a first transcode worker thread, wherein each one of the plurality of transcode worker threads are configured to monitor the segment transcode request queue or independently perform transcoding operations on segments, transcode by a second transcode worker thread a segment referenced by the segment transcode request in accordance with the one or more transcode request parameters, determine by the manifest processor whether the second transcode worker thread has completed transcoding the segment and is still operating, and, if not, return, via the messaging bus, the segment transcode request to the segment transcode request queue, and transcode the segment by a third transcode worker thread, and store the transcoded segment.

In one embodiment, the non-transitory computer readable medium further comprises instructions that, when executed by the at least one processor, cause the system to retrieve a manifest referenced by the transcode request, and parse the manifest by the manifest processor to locate the segment and include a location of the segment in the segment transcode request.

In another embodiment, the non-transitory computer readable medium further comprises instructions that, when executed by the at least one processor, cause the system to publish, by the second or third transcode worker thread via the messaging bus, a segment transcode notification in a segment transcode notification queue, wherein the segment transcode notification indicates a successful transcode of the segment, and wherein the segment transcode notification queue is provided by the messaging service, and merge the segment transcode notification with any other segment transcode notifications in the segment transcode notification queue.

In another embodiment, the non-transitory computer readable medium further comprises instructions that, when executed by the at least one processor, cause the system to start a time interval, retrieve by the manifest processor the segment transcode notification or a merged notification from the segment transcode notification queue, in response to an expiration of the time interval, and create by the manifest processor a new manifest including information related to the transcoded segment and other segments referenced by the merged notification.

In another embodiment, the non-transitory computer readable medium further comprises instructions that, when executed by the at least one processor, cause the system to assign a unique identifier (UID) to a media stream, wherein the manifest and the segment are associated with the media stream, and reference the UID in the transcode request, the segment transcode request, and the segment transcode notification.

In another embodiment, the non-transitory computer readable medium further comprises instructions that, when executed by the at least one processor, cause the system to, when determining by the manifest processor whether the second transcode worker thread has completed transcoding the segment and is still operating, place the segment transcode request in a transcode reattempt queue, wherein the transcode reattempt queue is a separate queue from the segment transcode request queue, wherein the transcode reattempt queue is provided by the messaging service, and wherein available transcode worker threads monitor the transcode reattempt queue in order to retrieve requests from the transcode reattempt queue and transcode segments referenced by segment transcode requests in the transcode reattempt queue.

BRIEF DESCRIPTION OF THE DRAWINGS

For a more complete understanding, reference is now made to the following description taken in conjunction with the accompanying Drawings in which:

FIG. 8B illustrates another diagrammatic view of the system of FIG. 8A;

DETAILED DESCRIPTION

Figure 1:
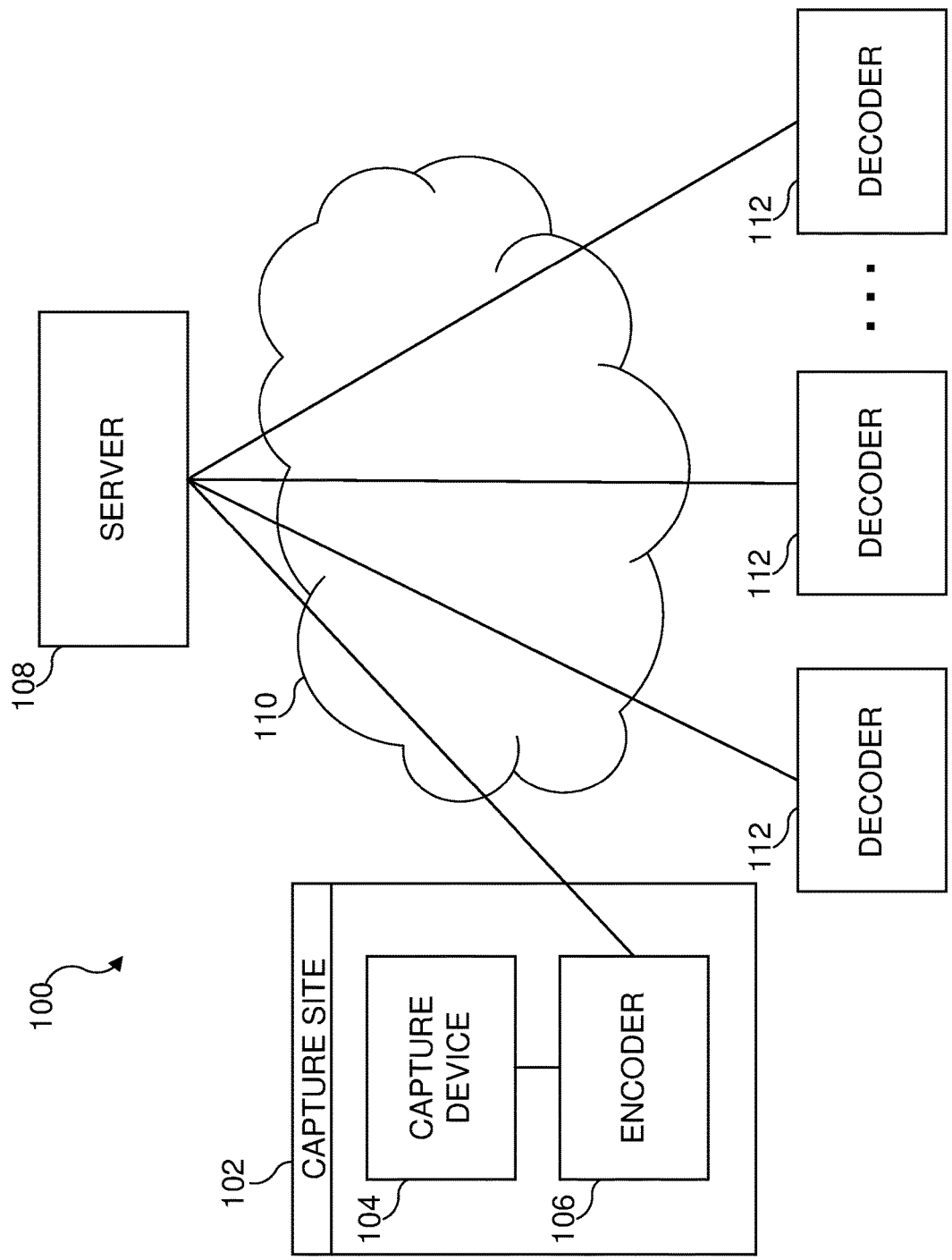
FIG. 1 illustrates one embodiment of a digital content streaming system.

Referring now to the drawings, wherein like reference numbers are used herein to designate like elements throughout, the various views and embodiments of a system and method for transcoding a media stream are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated of a digital content streaming system 100 in accordance with various embodiments of the present disclosure. The system 100 includes a capture site 102. The capture site 102 is a location at which digital content is to be captured, or recorded, and stored. The capture site 102 includes a capture device 104 connected to an encoder 106. In some embodiments, the capture device 102 can be a physical device for capturing video and audio that passes the captured video and audio to the encoder 106. For instance, the capture device 104 could be a video camera connected as a peripheral device to the encoder 106, a webcam contained within the encoder 106, a device on a network to capture video and audio and to transmit the video and audio to the encoder 106 over the network, or any other device capable of capturing video and audio, or other types of digital content. In other embodiments, the capture device 104 may not be a physical device, but rather a method for acquiring video by the encoder 106 such as software and network processes and functions, including, but not limited to, an ability of the encoder 106 to capture video of its associated display, such as recording its desktop, retrieving a video from a location on a network, and using technologies such as Network Device Interface (NDI). In embodiments using technologies similar to NDI, multimedia content is captured by a device on a network which the encoder 106 is also connected. The encoder 106 could receive this multimedia content over the network to encode or re-encode the content. Therefore, the capture device 104, in its various embodiments, is not limited to physical devices that allow for the capture of video and audio content, but also may include any other means for accessing content by the encoder 106, such as video content being already stored on the network and retrieved by the encoder 106.

The encoder 106 may be a custom built machine that allows for video to be received via a capture device, processed, and stored on a local drive connected to the machine. The encoder 106 may run an operating system capable of executing various programs. The encoder 106 also may, in some embodiments, operate as a web server similar in function to a server 108. In this way, the encoder 106 provides digital content to client applications running on equipment that is either on the local network of the encoder 106, or on outside networks. The encoder also can establish a connection with a server 108 over a network 110 for enhanced distribution capabilities.

The server 108 serves to store digital content uploaded to the server 108 by the encoder 106. The server 108 then streams the digital content to a plurality of decoders 112 connected to the server 108 over the network 110. The plurality of decoders 112 can be, or run on, any device capable of executing the decoder, including PCs, laptops, mobile devices, custom decoding machines, or other devices. Additionally, the decoder 112 can be a program stored and executed by a device or can be implemented in other ways, such as within a webpage accessed by a web browser. The server 108 may be a single server accessed over the Internet, or may be a distribution system containing multiple servers designed to meet the load demand of a large number of end users. This distribution system may be a content delivery network (CDN) provided by a third-party with the resources and capacity to meet the demand, such as those provided by Google, Amazon, and others.

The plurality of decoders 112 may run on devices having appropriate output ports for allowing a display to be connected thereto for viewing the digital content, such as VGA ports, composite video (RCA) ports, HD-SDI, HDMI ports, or any other ports capable of allowing a display to be connected to the decoders 112. Alternatively, the plurality of decoders 112 may also allow for viewing of the digital content on a display directly connected to the device on which the decode client 112 is running, such as laptops, mobile devices, or any other device having a display. The decoders 112 may be executed on a device running an operating system capable of executing various programs. The decoders 112 may be executed on custom built decoder boxes supplied to various partners of the capture site, on a PC running an operating system and capable of running the decoder, or any other device that allows for the decoder to be executed thereon.

The embodiments described herein disclose a system in which all segmenting of files is done at the encoder 106. The encoder 106 further stores all segmented files and the manifest files. Therefore, in some embodiments, the server 108 is used merely for providing the bandwidth required to meet the demand of end users. The encoder 106, or a server connected locally to the encoder 106, can function in place of the server 108 as a web server if needed. The server 108 does not perform any of the operations of segmenting files, but rather only stores segment files and manifest files for download by end users using the decoder 112.

Figure 2:
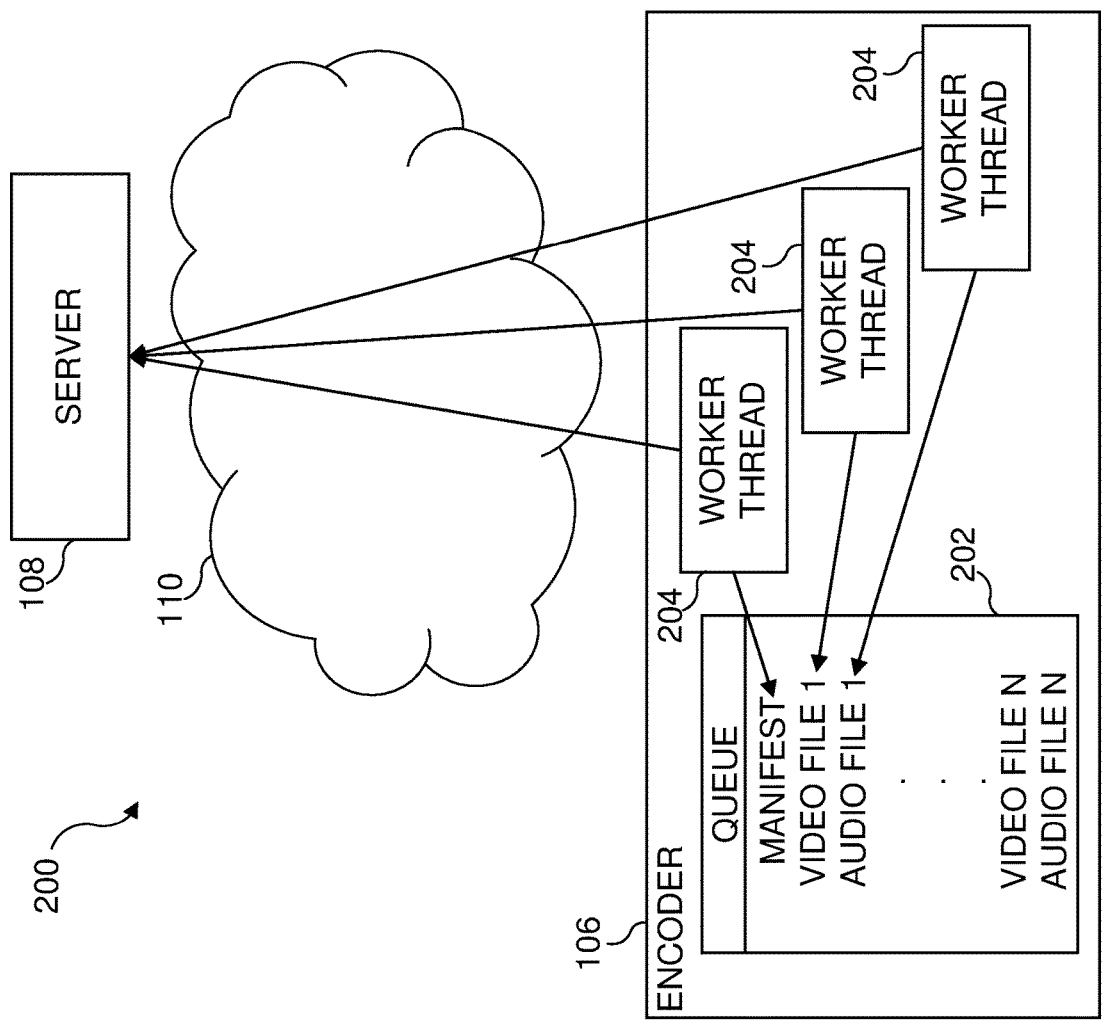
FIG. 2 illustrates one embodiment of an asynchronous queuing and upload system.

Referring now to FIG. 2, there is illustrated an asynchronous queuing and upload system 200 in accordance with various embodiments of the present disclosure. The encoder 106 creates a queue of segment files 202. Segment files are typically files that are short segments of the digital content created from the source content to allow for faster uploading and downloading. The segment files are segmented based on particular lengths, such as four seconds, with each segment being of the same length. It will be appreciated by one skilled in the art that other lengths may be used. Additionally, in some cases the last segment file for a particular item of digital content may be of a different length than the other segment files. For instance, if the segment files are designated as being four seconds each, and the source content is a total of 58 seconds in length, the segment files will have 15 segment files consisting of 14 four-second segments and one two-second segment as the last segment. The segment files in the queue may consist of audio files, video files, or any other type of digital content. Additionally, the queue also includes a manifest file. The manifest file contains information on all the segment files that includes information that allows for those segment files to be located on and downloaded from the server 108 or any other location they may be stored.

The system 200 further includes at least one upload worker thread 204. An upload worker thread 204 is a separate process or function that runs independently from any other threads and from other operations run by the encoder 106, such as receiving audio and video content, and encoding, segmenting, and adding to the queue 202 said content. One purpose of the upload worker threads 204 is to take files from the queue 202, with the first file in the queue 202 (first-in-first-out) being taken by the first worker thread 204 that is started. The upload worker thread 204 then attempts to upload the file to the server 108. Any number of worker threads 204 may be initiated, each taking a file from the queue 202, to allow for multiple files to be within the upload process at the same time. However, as each upload worker thread 204 operates independently from other operations of the encoder 106, the files are thus uploaded asynchronously from those other operations.

For example, the encoder 106 may continue to receive, encode, segment, and add video to the queue 202 while upload worker threads continue to take files from the queue 202 and upload them to the server 108. The upload worker threads will continue to work if needed if the other processes have stopped, and the other processes of recording, segmenting, storing, and queueing will continue even if the upload worker threads have stopped. The upload worker threads 204 also work asynchronously from each other, with each upload worker thread 204 finishing its task depending on how quickly that particular upload worker thread 204 accomplishes the task. Therefore, the upload worker threads 204 may finish uploading the files at different times. Once an upload worker thread 204 finishes its task, it is terminated and, if more files are still in the queue, another upload worker thread 204 is started to take and upload the next file in the queue.

It will be appreciated by one skilled in the art that the number of upload worker threads 204 may vary depending on the desired speed of uploading all files in the queue 202, and the amount of accepted overhead and use of system resources. For example, in some systems, only three upload worker threads 204 may be allowed to run, while other systems may allow for ten, for example, or any other number.

Figure 3:
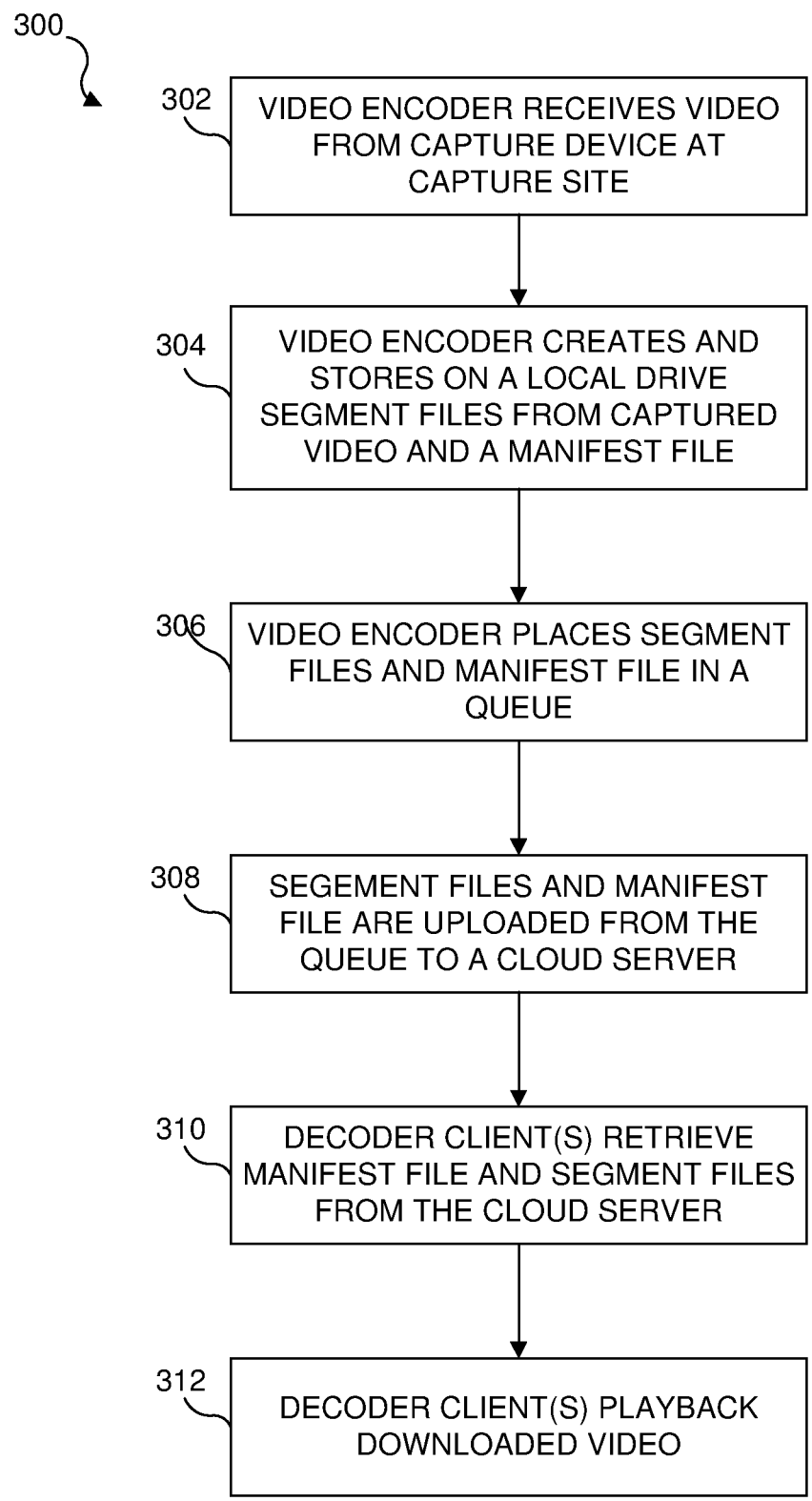
FIG. 3 illustrates a flowchart of one embodiment of a video streaming process.

Referring now to FIG. 3, there is illustrated a flowchart of a video streaming process 300 in accordance with various embodiments of the present disclosure. At step 302, the encoder 106 receives video from the capture device 104. At step 304, the encoder 106 creates and stores on a local drive connected to the encoder 106 segment files created from the captured video, as well as a manifest file. The segment files may be both video and audio files, with each segment being of a particular length, such as four seconds. Since the segment files are stored on a local drive, in some embodiments the encoder 106 may act as a web server to allow devices on the local network to access the content, or, in some embodiments, to allow for devices outside of the local network to access the content over the network 110.

At step 306, the encoder 106 places the segment files and the manifest file in a queue. At step 308, the segment files and manifest file are uploaded to a server in the manner described herein. At step 310, the plurality of decoders 112 retrieve the manifest file and the segment files from the server in the manner described herein. At step 312, the plurality of decoders 112 playback the downloaded content. It will be appreciated that the digital content provided by this process and the other processes disclosed herein may be other forms of digital content besides video, such as audio content, or other forms of digital content that can be provided in this manner.

Segment files may be encrypted and uploaded as encrypted files to the server 108. The segment files may then be decrypted once downloaded by a decoder 112 in order to play the files. Decryption keys may be created and uploaded, listed in the manifest file, and downloaded along with the segment files.

Figure 4:
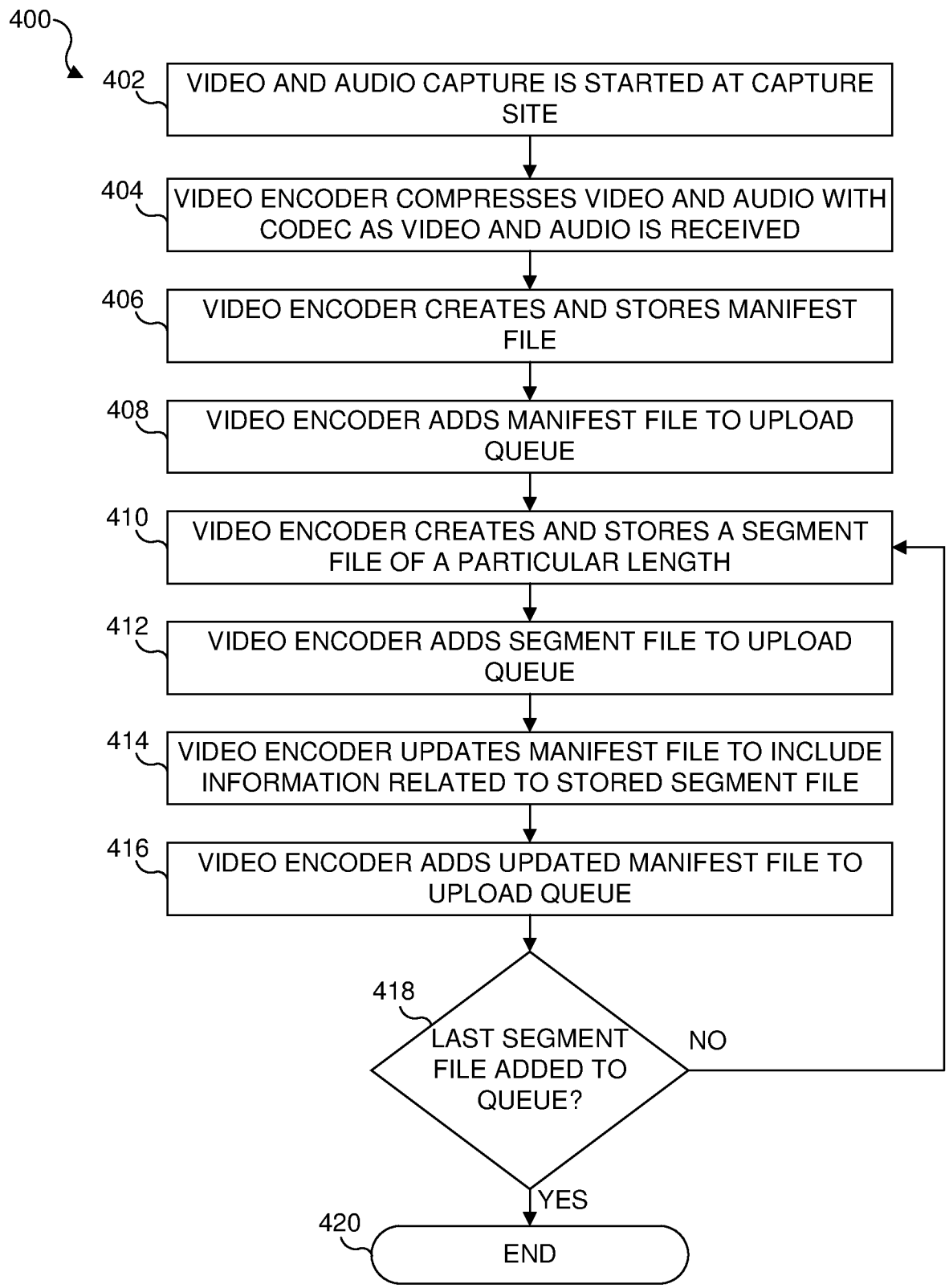
FIG. 4 illustrates a flowchart of one embodiment of a file segmenting and queueing process.

Referring now to FIG. 4, there is illustrated a flowchart of a file segmenting and queueing process 400 in accordance with various embodiments of the present disclosure. At step 402, video and audio capture is started at the capture site 102. Video and audio capture may include recording an event with a video camera, retrieving video from a location on a network, receiving video signals using NDI technologies, or any other means for acquiring video and audio by the encoder 106. At step 404, the encoder 106 compresses the video and audio using a defined codec as the video and audio is received. For example, video may be compressed using H.264, H.265/HEVC, VP8, VP9 or other video codecs. The audio may be encoded using AAC, MP3, Vorbis, Opus, or other audio codecs. Encoded audio and video may be assembled in container bitstreams using MP4, FLV, WebM, ASF, or other methods depending on the streaming protocol to be used. At step 406, the encoder 106 creates and stores a manifest file. At step 408, the encoder 106 adds the manifest file to an upload queue. At step 410, the encoder 106 creates and stores a segment file of a particular length, such as four seconds. At step 412, the encoder 106 adds the segment file to an upload queue. At step 414, the encoder updates the manifest file to include information related to the segment file created in step 410. At step 416, the encoder 106 adds the updated manifest file to the upload queue.

At decision block 418, it is determined whether the segment file added to the queue at step 412 is the last segment file that needs to be created, i.e., the last segment file containing the last portion of the source digital content. This determination may be accomplished by determining whether more content is currently being received from the capture device 104. If the segment file added to the queue in step 412 is not the last segment file that needs to be created, the process 400 moves back to step 410 to create, store, and add to the queue a new segment file (steps 410 and 412) and to update and add to the queue the manifest file (steps 414 and 416). If at step 418 it is determined that the segment file added to the queue at step 412 is the last segment file that needs to be created, the process 400 ends at step 420.

While the upload queue is created to facilitate upload of all files, the files may also be permanently stored at the storage drive associated with the encoder 106. This ensures that a complete copy is saved, at least for a certain period of time or as defined by storage capacity, such as only allowing 12 hours of content to reside on the storage drive at a time, to ensure that no files are lost before a complete, high quality, copy of the content is uploaded and data integrity verified. Additionally, as noted herein, the encoder 106 may act as a web server to provide the stored files to local or remote end users.

It will be understood that creation of the manifest file, creation of the segment files, and eventual streaming of the content to end users is accomplished using particular streaming libraries and protocols. Such streaming libraries may include FFmpeg, Libav, MPlayer, AviSynth, or others. Such streaming protocols may include Flash, Microsoft Smooth Streaming, Dynamic Adaptive Streaming over HTTP (DASH), HTTP Live Streaming (HLS), or other streaming protocols.

Figure 5:
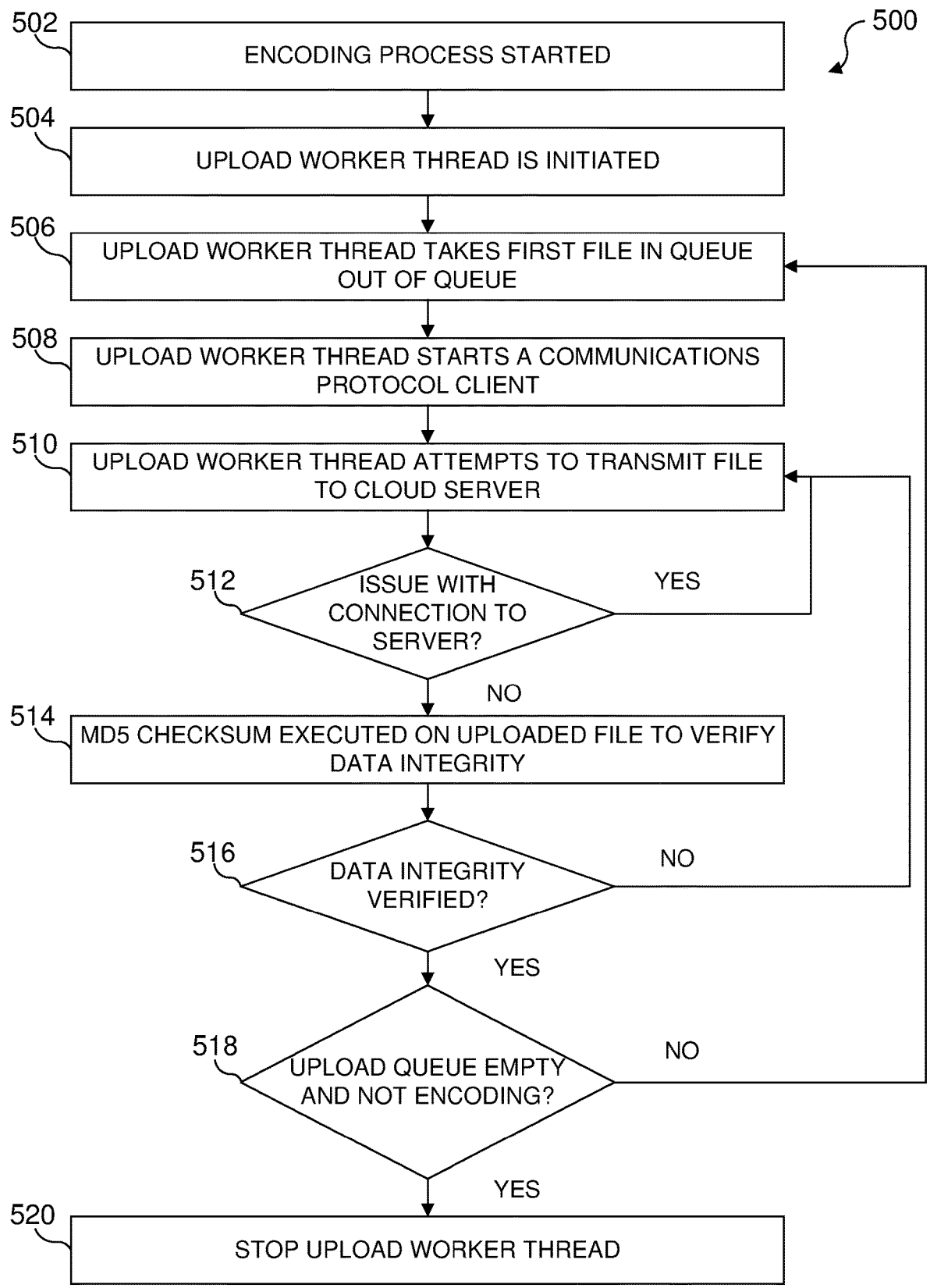
FIG. 5 illustrates a flowchart of one embodiment of an upload worker thread process.

Referring now to FIG. 5, there is illustrated a flowchart of an upload worker thread process 500 in accordance with various embodiments of the present disclosure. At step 502, the encoding process starts. At step 504, an upload worker thread is initiated. At step 506, the upload worker thread takes the first file in the queue out of the queue. This may be done with a command such as file f=queue.take( ), or any other command that accomplishes this task. It will be appreciated by one skilled in the art that step 506 may come before step 504. For instance, a program running on the encoder 106 may take the first file out of the queue using a command such as file f=queue.take( ) (step 506), assign the file to a variable, and then pass the variable to a upload worker thread function, by a command such as upload(f), where upload( ) is an upload worker thread function call, thus creating the upload worker thread (step 504) with the file already taken out of the queue and known to the upload worker thread.

At step 508, the upload worker thread creates an instance of a communications protocol client. This may be a client using HTTP, IAP, FTP, SMTP, NNTP, or any other protocol for allowing transmission of information and files over the internet and using a transport layer protocol such as TCP. This may use a command such as HTTP Client client=new HTTP Client, for example, or another command for starting a new client. At step 510, the upload worker thread attempts to transmit the file to the server 108. This attempt may use a command such as client.post(file), for example, or another command for sending the file. At decision block 512, it is determined whether there is any issue or instability with the connection to the server 108. The issue may result from a drop in connection between the encoder 106 and the server 108, slow connection speeds, or any other issue that interferes with transmittal of the file to the server. This may be an active check of the network status, or it may be passive. If it is a passive check, in some embodiments, the upload worker thread may simply stall until the connection is restored. In other embodiments, the upload worker thread may run a loop wherein multiple attempts are made to transmit the file, such as using a try/catch exception process wherein the upload status of the file is only verified if a network exception is not caught, and may also include a threshold wherein the loop will terminate upon a certain number of failed attempts. If it is determined that there is an issue with the connection to the server, the process moves back to step 510 to attempt to again transmit the file to the server 108. If at step 512 there is no issue with the connection to the server, the process 500 moves to step 514.

At step 514, an MD5 checksum is executed on the uploaded file to verify data integrity of the uploaded file. At decision block 516, it is determined whether the file passed the MD5 checksum. If the uploaded file did not pass the MD5 checksum, the process moves back to step 510 to again attempt to transmit the file to the server 108, replacing the failed file. If the uploaded file passes the MD5 checksum, the process moves to decision block 518. At decision block 518, it is determined whether the upload queue is now empty and whether the encoder is no longer encoding content to be added to the queue. If the upload queue is empty and the encoder is finished encoding, the process 500 ends at step 520, where the upload worker thread is terminated. If the upload queue is not empty, the process 500 moves back to step 506 to take the next file in the queue. In the event that the upload queue is empty, but the encoder is still encoding content, the upload worker thread may sleep for a small amount of time before checking the queue again to determine if a file is now available to be processed.

It will be understood that there may be more than one upload worker thread working at the same time. For example, in some embodiments, three upload worker threads may be allowed to run concurrently. One may be finishing its task while the other two are still attempting to upload files they pulled from the queue. The one finishing its task is terminated at step 520, while the other two upload worker threads continue to work.

Figure 6:
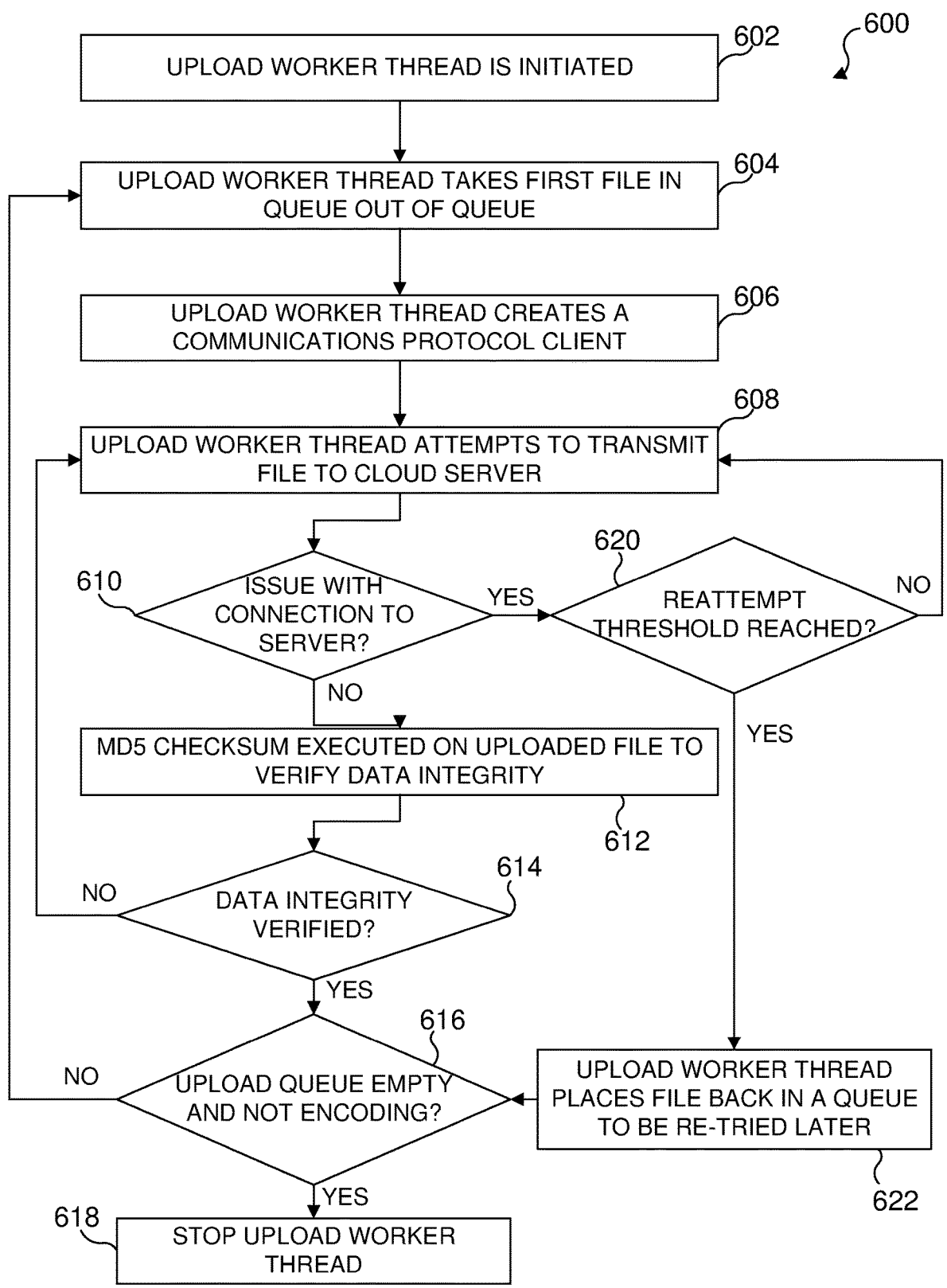
FIG. 6 illustrates a flowchart of another embodiment of an upload worker thread process.

Referring now to FIG. 6, there is illustrated a flowchart of an upload worker thread process 600 in accordance with various embodiments of the present disclosure. At step 602, an upload worker thread is initiated. At step 604, an upload worker thread takes the first file out of the upload queue. This may be done with a command such as file f=queue.take( ), or any other command that accomplishes this task. At step 606, the upload worker thread creates an instance of a communications protocol client. This may be a client using HTTP, IAP, FTP, SMTP, NNTP, or any other protocol for allowing transmission of information and files over the internet and using a transport layer protocol such as TCP. This may use a command such as HTTP Client client=new HTTP Client, for example, or another command for starting a new client. At step 608, the upload worker thread attempts to transmit the file to the server 108. This attempt may use a command such as client.post(file), for example, or another command for posting the file. At decision block 610, it is determined whether there is any issue or instability with the connection to the server 108. The issue may result from a drop in connection between the encoder 106 and the server 108, slow connection speeds, or any other issue that interferes with transmittal of the file to the server. If at step 610 there is no issue with the connection to the server, the process 600 moves to step 612.

At step 612, an MD5 checksum is executed on the uploaded file to verify data integrity of the uploaded file. At decision block 614, it is determined whether the file passed the MD5 checksum. If the uploaded file did not pass the MD5 checksum, the process moves back to step 608 to again attempt to transmit the file to the server 108, replacing the failed file. If the uploaded file passes the MD5 checksum, the process moves to decision block 616. At decision block 616, it is determined whether the upload queue is now empty and whether the encoder is no longer encoding content to be added to the queue. If the upload queue is empty and the encoder is finished encoding, the process 600 ends at step 618, where the upload worker thread is terminated. If the upload queue is not empty, the process 600 moves back to step 604 to take the next file in the queue. In the event that the upload queue is empty, but the encoder is still encoding content, the upload worker thread may sleep for a small amount of time before checking the queue again to determine if a file is now available to be processed.

It will be understood that there may be more than one upload worker thread working at the same time. For example, in some embodiments, three upload worker threads may be allowed to run concurrently. One may be finishing its task while the other two are still attempting to upload files they pulled from the queue. The one finishing its task is terminated at step 618, while the other two upload worker threads continue to work.

If at decision block 610 it is determined that there is an issue with the connection to the server, the process moves to decision block 620. At decision block 620, it is determined whether a reattempt threshold has been reached. The reattempt threshold is a set number of failed upload attempts for the current upload worker thread. If the threshold has not yet been reached, the process moves back to step 608 to again attempt to transmit the file to the server 108. The reattempt threshold check may also occur after decision block 614 in response to a failed MD5 checksum. If the reattempt threshold has been reached, the process 600 moves to step 622. At step 622, the upload worker thread places the file back in a queue to be re-tried at a later time. In some embodiments, the queue that the file is placed into after the reattempt threshold is reached is the same queue that the file was originally taken at step 604.

In other embodiments, there may be a separate reattempt queue created to receive only files that were attempted to be uploaded, but failed and met the reattempt threshold. This separate reattempt threshold allows for a file that failed to be uploaded to be retried sooner than if the file is placed back into the original queue because, if placed back in the original queue, all other files already in the queue would have to be processed before reupload is attempted for the failed file. If placed into a reattempt queue, however, there may be parameters implemented for triggering an upload worker thread to attempt to upload the first file in the reattempt queue instead of processing the first file in the main queue. This trigger may be based on time, on the number of upload worker threads created and terminated since the failed file was added to the reattempt queue, the number of files uploaded from the main queue since the failed file was added to the reattempt queue, or other triggers. Thus, the reattempt queue helps to shorten the amount of time in which a particular segment file is missing from the server 108 in the event that an end user starts to stream the content from the server 108 before all the files have been uploaded.

From step 622, the process 600 moves to decision block 616. At decision block 616, it is determined whether the upload queue is now empty and whether the encoder is no longer encoding. If so, the process 600 ends at step 618. If the upload queue is not empty, the process 600 moves back to step 602 to initiate a new upload worker thread to process the next file in the queue.

Figure 7:
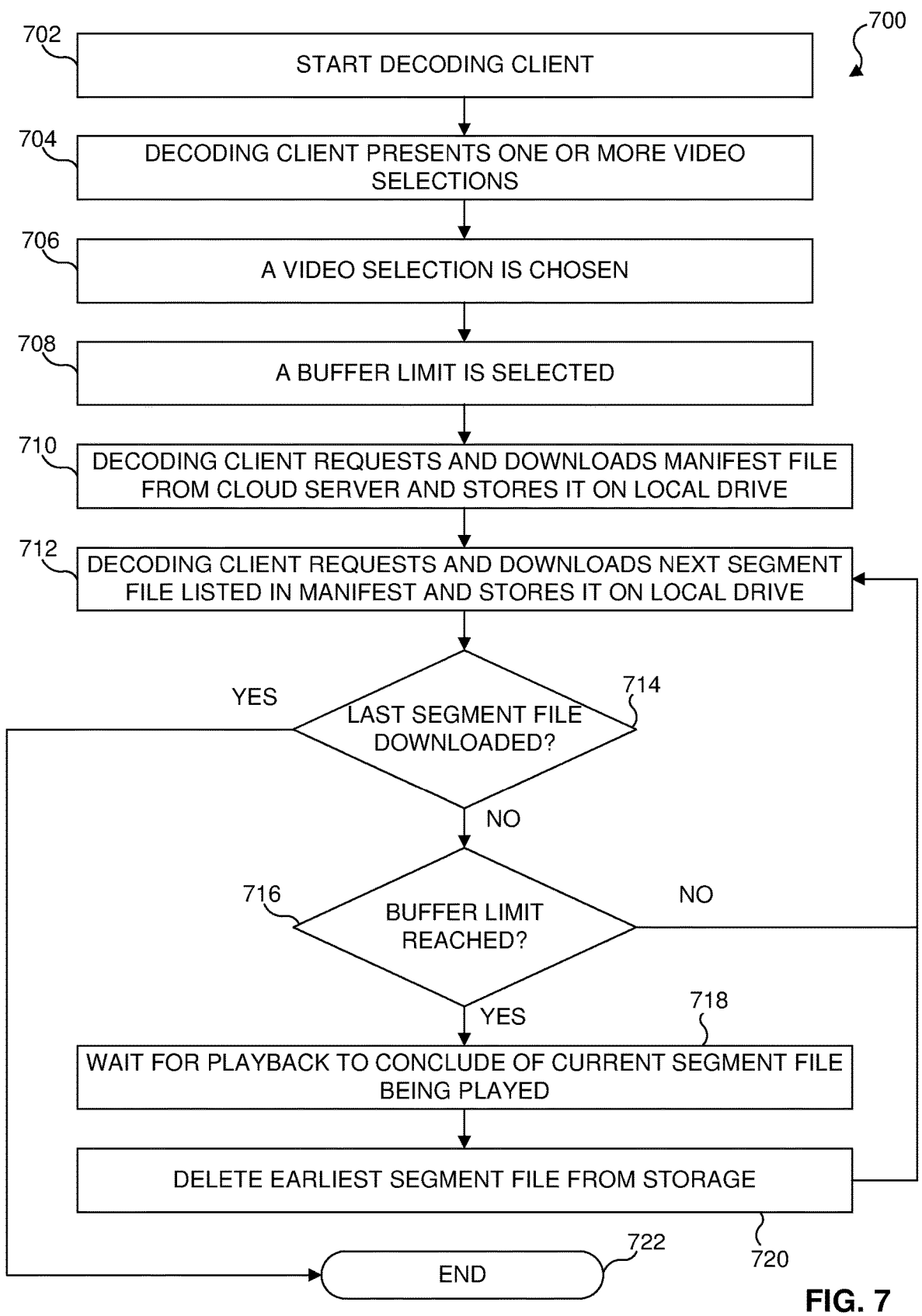
FIG. 7 illustrates one embodiment of a digital content downloading and playback method.

Referring now to FIG. 7, there is illustrated a digital content downloading and playback method 700 in accordance with various embodiments of the present disclosure. At step 702, a decoder is started. The decoder may be an application permanently stored on a device, or may instead be implemented within a website and accessed via a web browser. The decoder may require a user to go through an authentication process in order to gain access to content. This authentication process may require a username and password, or any other means of authentication. Thus there may be a database configured at either the server 108 or at the encoder 106 to store authentication information in relation to stored digital content. In this way, only certain end users may have access to content provided by a particular capture site, and would not have access to content created by unaffiliated capture sites. The capture site 102 may be affiliated with the end users using the decoder. Thus, a single username and password may be used for the capture site 102 and associated end users. Alternatively, each end user may all share a unique username and password, or each may have its own unique username and password, separate from that used at the capture site 102. In this way, each of the end users associated with the capture site 102 may access content uploaded by the capture site 102.

At step 704, the decoder presents one or more video options selections available to be played. The video selections presented are either videos that have already been uploaded to the server 108, or are currently in the process of being uploaded to the server 108. The decoder may additionally present this information, and may also indicate how much of a video that is currently in the process of being uploaded has been saved to the server 108. At step 706, one of the video selections is chosen. At step 708, a buffer limit is selected. A buffer limit is the amount of the video to be downloaded ahead of time. So, for example, if a buffer limit of four minutes is selected, the decoder will download four minutes of the video. If playback is started, the decoder may continuously keep four minutes of video buffered ahead of the current point in the video being played. The buffer limit may be set to any length of time, up to the full length of the video (such as 60 minutes) on the server 108.

The decoder then saves downloaded segment files on a local drive, rather than in system memory, to allow for up to the entire video to be saved. The buffer limit allows end users to create an amount of time where, even if there is a network outage, the content will continue to be played. For example, if the buffer limit is set to 15 minutes, and that buffer limit is met (15 minutes of the content have been downloaded), the content will continue to play for 15 minutes even if there is a network outage, allowing for time for the network outage to be addressed before the content is unable to continue to be played.

At step 710, the decoder requests and downloads a manifest file for the chosen video selection and stores it on a local drive. At step 712, the decoder requests and downloads the next segment file listed in the manifest, starting with the first segment file, and stores it on the local drive. It will be understood that playback of the video may be started at any point after the first segment file is downloaded at step 712. Additionally, in the event that the content stored on the server is not yet complete, the downloaded manifest file may be outdated. In this event, the decoder may download an updated manifest from the server 108 to be able to find the next segment file needed. Alternatively, each segment file may include embedded lookahead information that contains the information needed to retrieve at least the next file in sequence, avoiding the need to download an updated manifest file. For example, in some embodiments, the lookahead information may contain information for the next two segment files, requiring that the next two segment files also are created before a segment file can be uploaded to the server 108. At decision block 714, it is determined whether the last segment file has been downloaded. If not, the process moves to decision block 716, where it is determined if the buffer limit has been reached by the download of the segment file in step 712. If the buffer limit has not been reached, the process moves back to step 712 to begin downloading the next segment file listed in the manifest. If the buffer limit has been reached, the process moves to step 718. At step 718, the decoder waits for playback of the current segment file being played to finish.

At step 720, the earliest segment file stored on the local drive is deleted to make room for the next segment file to be downloaded. The process then moves back to step 712 to download the next segment file listed in the manifest file. It will be understood that step 720 may not occur if it is desired that the full video remain stored. If the full video is to remain on stored, it allows for end users to back up or move forward in the content without the need to redownload segments to play previous content. It also allows for the full video to be saved and stored. This is also useful if the content is to be watched later, and if an audience is to view the content, then the content can be downloaded and stored in its entirety, avoiding any latency issues that may occur while downloading content during a time when the content is currently being played. It will also be understood that, upon download of all the segment files, the decoder may reassemble the segments into a single file so that end users may easily move and save the video file. If at decision block 714 it is determined that the last segment file has been downloaded, the process 700 ends at step 722.

The systems and methods described herein may be used to upload and store content on the server 108 ahead of time before end users need to consume content. The end users would then download content that is already fully saved on the server 108. In other scenarios, end users may want to begin playback of content as soon as possible to the start of the upload process at the capture site 102. In other scenarios, a capture site 102 may begin a live event where a speaker, for example, is being recorded. To ensure that end users do not experience waiting for buffer times when trying to watch close to real time, end users may set a delay in time before which they begin consuming the content. For example, the end users may decide to not begin consuming the content until 30 minutes after recording of the event has started at the capture site 102. In this scenario, as well as other scenarios, the end user may set a buffer time, as described with respect to FIG. 7, to begin downloading the content as it is available on the server.

A live event may not necessarily be constrained to only mean that end users are watching the event occurring at the capture site in real time. Rather, the live event at the capture site is recorded as a live event, i.e., no multiple takes or stopping the recording of the event, and is simultaneously, using the processes described herein, made available to be streamed to the end users. There may be a delay when end users attempt to view the event as soon as it starts at the capture site, such as 30 seconds, but the event at the capture site is still considered live. As segments are created at the encoder 106, attempts are made to upload all the segments to the server 108 while the recording of the live event is still taking place. This is to ensure that segments are made available for download as soon as possible, instead of waiting for all content to be captured before attempting to make the content available for viewing. Additionally, the system is designed to ensure that all video content is provided as high-quality content by requiring that all segment files reach the server 108 as complete, high-quality, files regardless of network interruptions, rather than attempting to upload the files more quickly to meet demand by skipping segment files or degrading content. In some embodiments, a default delay time may be implemented on the decoder 112, such as a fifteen-second delay. Depending on the speed of the network and the speed of the uploading and downloading process, this delay may be altered, such as increasing it to 30 seconds, 5 minutes, 30 minutes, an hour, etc. This delay allows for content to be downloaded during the delay time, and played once the delay time is over.

Figure 8A:
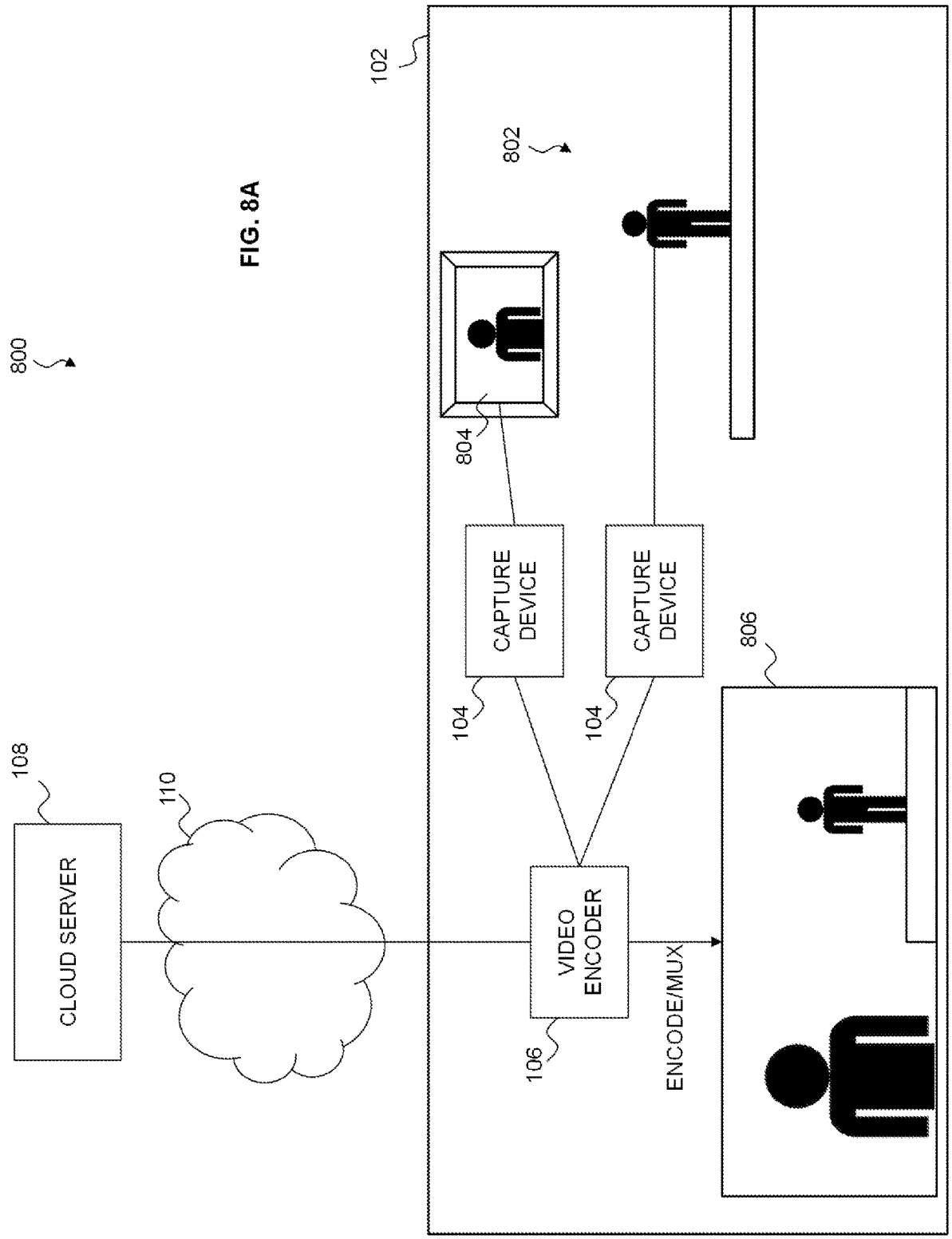
FIG. 8A illustrates a diagrammatic view of one embodiment of a combined dual stream video encoding and output system.

Referring now to FIG. 8A, there is illustrated a diagrammatic view of a combined dual stream video encoding and output system 800 in accordance with various embodiments of the present disclosure. The system 800 includes the capture site 102 and the encoder 106 connected to the server 108 over the network 110. The encoder 106 is connected to more than one capture device 104. The captures devices 104 are used to capture multiple scenes at the capture site 102. For example, in FIG. 8A, there is a first scene 802 and a second scene 804. In this example shown in FIG. 8A, the first scene 802 is of a speaker on a stage and the second scene 804 is a zoomed in close up of the speaker presented on a screen at the capture site 102. Each of the capture devices 104 is focused on one of the scenes 802 and 804. The capture device 104 that is focused on the second scene 804 is zoomed and focused on the images displayed in the screen, avoiding capturing the screen border.

The encoder 106, upon receiving the individual video streams, encodes/multiplexes the two streams into one image, or canvas. This results in a single image or video file 806 that includes both videos (of both the first and second scenes 802 and 804) in a combined image that is at a resolution that is twice the width, but the same height, as the original image. For instance, if the resolution of each of the streams captured by the capture devices 104 is 1920×1080, and is encoded/multiplexed onto the same canvas, the resulting image is at a resolution of 3840×1080. The file 806 is then uploaded to the server 108 according to the methods described herein. Only a single audio file may be created during this process, unless the captured scenes include different audio. However, in the present example, only the first scene 802 is generating audio.

Referring now to FIG. 8B, there is illustrated another diagrammatic view of the system 800 in accordance with various embodiments of the present disclosure. A decoder 112 downloads the previously-created file 806, containing the first and second scenes 802 and 804 combined in a 3840×1080 video. The decoder 112 breaks out each scene in the 3840×1080 video into separate 1920×1080 outputs, effectively cutting the width of the image in the file 806 in half. The separate outputs are each displayed on separate screens, with the video captured from first scene 802 displayed on a screen 808, and the video captured from the second scene 804 displayed on a screen 810. This ensures the scenes on each of the screens 808 and 810 are completely in sync, which may not be achieved by streaming the original captured streams separately as separate videos.

Figure 9A:
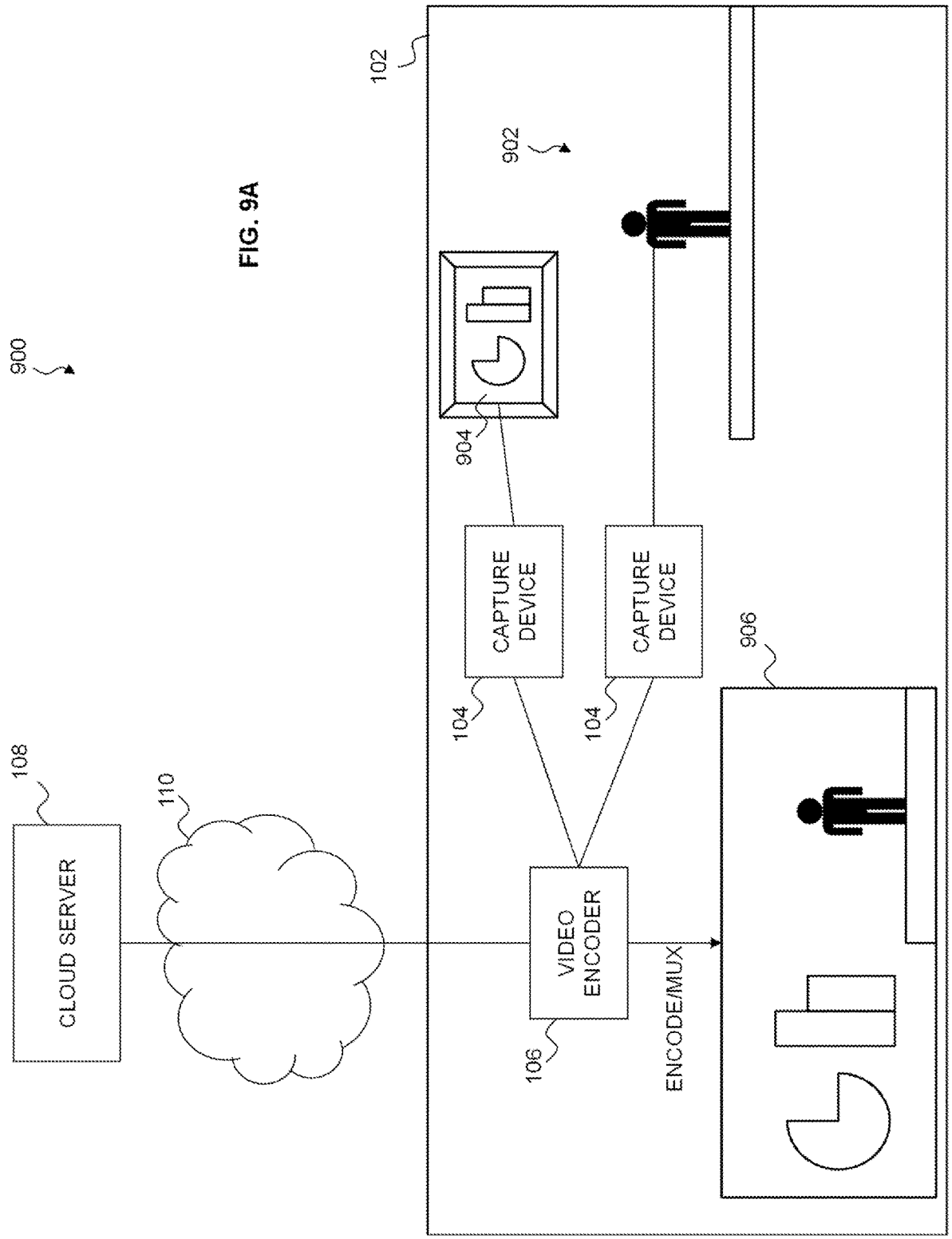
FIG. 9A illustrates a diagrammatic view of another embodiment of a combined dual stream video encoding and output system.

Referring now to FIG. 9A, there is illustrated a diagrammatic view of a combined dual stream video encoding and output system 900 in accordance with various embodiments of the present disclosure. The system 900 includes the capture site 102 and the encoder 106 connected to the server 108 over the network 110. The encoder 106 is connected to more than one capture device 104. The captures devices 104 are used to capture multiple scenes at the capture site 102. For example, in FIG. 9A, there is a first scene 902 and a second scene 904. In this example shown in FIG. 9A, the first scene 902 is of a speaker on a stage and the second scene 904 is of a presentation, such as slides, accompanying the speaker's presentation and presented on a screen. Each of the capture devices 104 is focused on one of the scenes 902 and 904. The capture device 104 that is focused on the second scene 904 is zoomed and focused on the images displayed in the screen, avoiding capturing the screen border.

The encoder 106, upon receiving the individual video streams, encodes/multiplexes the two streams into one image, or canvas. This results in a single image or video file 906 that includes both videos (of both the first and second scenes 902 and 904) in a combined image that is at a resolution that is twice the width, but the same height, as the original image. For instance, if the resolution of each of the streams captured by the capture devices 104 is 1920×1080, and is encoded/multiplexed onto the same canvas, the resulting image at a resolution of 3840×1080. The file 906 is then uploaded to the server 108 according to the methods described herein. Only a single audio file may be created during this process, unless the captured scenes include different audio. However, in the present example, only the first scene 902 is generating audio.

Figure 9B:
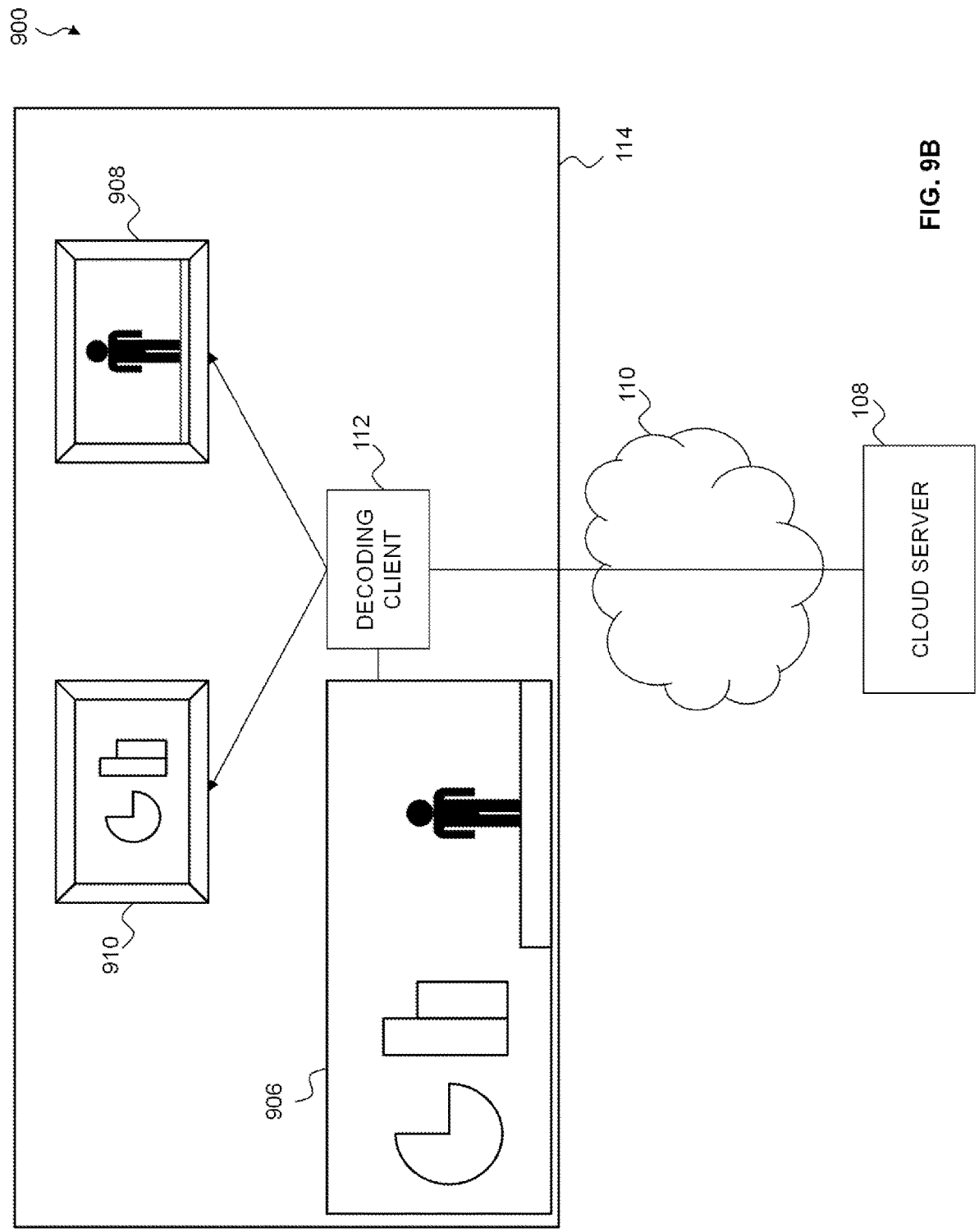
FIG. 9B illustrates another diagrammatic view of the system of FIG. 9A.

Referring now to FIG. 9B, there is illustrated another diagrammatic view of the system 900 in accordance with various embodiments of the present disclosure. A decoder 112 downloads the previously-created file 906, containing the first and second scenes 902 and 904 combined in a 3840×1080 video. The decoder 112 breaks out each scene in the 3840×1080 video into separate 1920×1080 outputs, effectively cutting the width of the image in the file 906 in half. The separate outputs are each displayed on separate screens, with the video captured from first scene 902 displayed on a screen 908, and the video captured from the second scene 904 displayed on a screen 910. This ensures the scenes on each of the screens 908 and 910 are completely in sync, which may not be achieved by streaming the original captured streams separately as separate videos.

Figure 10:
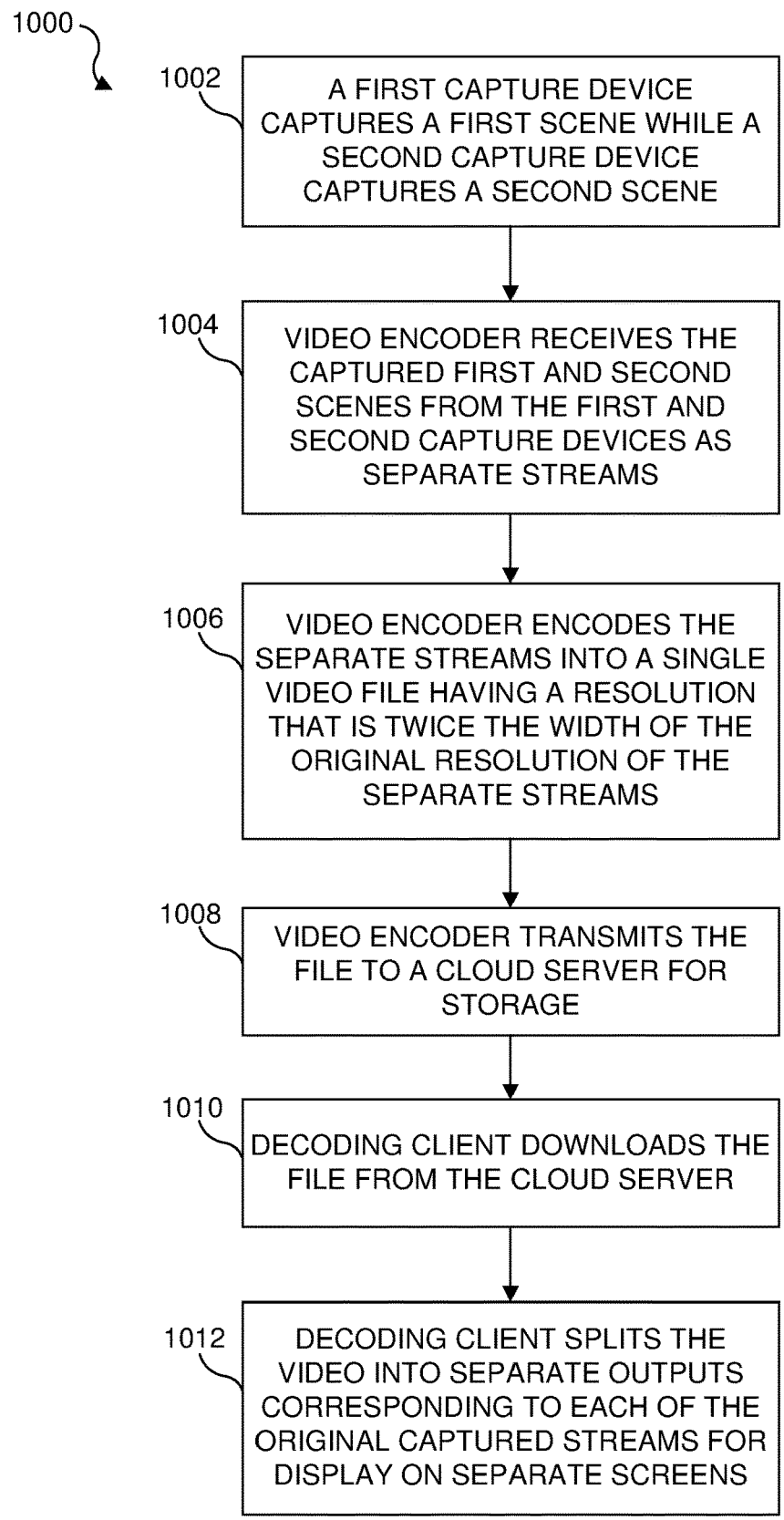
FIG. 10 illustrates a flowchart of one embodiment of a combined dual stream video encoding and output method.

Referring now to FIG. 10, there is illustrated a flowchart of a combined dual stream video encoding and output method 1000 in accordance with various embodiments of the present disclosure. At step 1002, a first capture device captures a first scene while a second capture device captures a second scene. At step 1004, an encoder receives the captured first and second scenes from the first and second capture devices as separate streams. This may be accomplished by the encoder having multiple video inputs associated with multiple video capture cards. At step 1006, the encoder encodes the separate streams into a single video having a resolution that is twice the width of the original resolution of the separate streams. Thus, if the videos captured by the first and second capture devices are at a 1920×1080, the resulting resolution is 3840×1080, creating a video where each of the captured videos play side-by-side. In some embodiments, the frames may be synced by the encoder based on the timestamp of each frame of the videos. Thus, if for some reason the timestamps differ, such as one video starting at a slightly later timestamp, the two input streams may be passed through a filter to set both videos to the same zeroed-out timestamp.

At step 1008, the encoder transmits the newly created side-by-side video file to a server for storage and eventual download. At step 1010, a decoder downloads the file from the server. At step 1012, the decoder splits the video into separate outputs corresponding to each of the original captured streams for display on separate screens. The decoder accomplishes this by displaying the first 1920×1080 section of the side-by-side video file on one screen, and the second 1920×1080 section on the other screen. Thus, the two images on the separate screens will correspond to the originally captured videos of the two scenes at the capture site, while being completely in sync.

Figure 11:
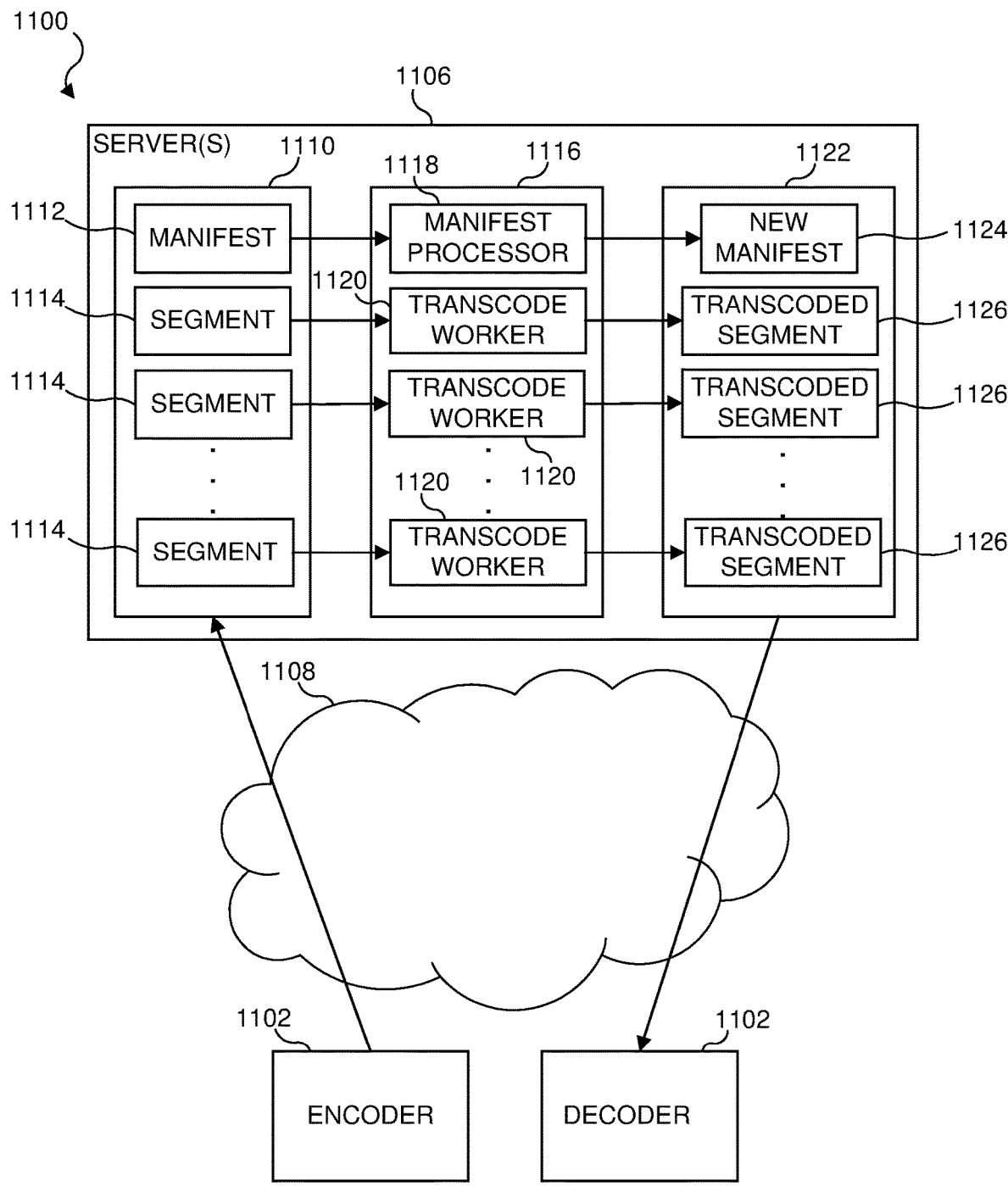
FIG. 11 illustrates a media stream transcoding system in accordance with various embodiments of the present disclosure.

Referring now to FIG. 11, there is illustrated a media stream transcoding system 1100 in accordance with various embodiments of the present disclosure. The system 1100 includes an encoder 1102 and a decoder 1104 in communication with the one or more servers 1106 over a network 1108. The one or more servers 1106 can be a single server accessed over the Internet, or may be a distributed system containing multiple servers designed to meet the load demand of a large number of end users. This distributed system may be a content delivery network (CDN) provided by a third-party with the resources and capacity to meet the demand, and media content can be stored in a distributed file system shared by the servers, with multiple copies of the media content in multiple data centers. The encoder 1102 transmits a media stream 1110 to the one or more servers 1106 as described herein, including performing data integrity checks to verify all content in the media stream 1110 is received by the one or more servers 1106. The contents of the media stream 1110 are stored on the one or more servers 1106 and include a manifest 1112, and at least one media segment 1114. It will be understood that that segments can be media containers that include a data stream of a particular format, such as video data, audio data, image data, or other data formats. The server further includes a transcoding module 1116 that includes a manifest processor 1118. The manifest processor 1118 can be a logical process carried out by the one or more servers 1106 and in some embodiments may be a threaded process. The manifest processor 1118 illustrated in FIG. 11 can be a single process including a plurality of threads, with multiple other manifest processors running concurrently with the manifest processor 1118. The plurality of manifest processor threads can, for example, include a thread to listen for new transcode requests, a thread to read in an input manifest and schedule segment transcodes, a thread to listen for transcode completion messages, and a thread to create a new manifest. The manifest processor 1118 receives transcoding requests from the one or more servers 1106. Multiple manifest processors 1118 can be running at a time, awaiting transcoding requests from the one or more servers 1106. If a manifest processor 1118 ceases reporting activity, another manifest processor 1118 can take its place to complete a transcode request. Transcoding requests can include various parameters and commands. For example, the transcoding request can include a command to transcode the contents of a particular media stream to a different resolution, transcode the contents to a different codec, such as from HEVC to H264, VP8, or other codec standards, crop frames in the video, resize a video such as reducing the length of the video, such as transcoding an hour of a two hour video to remove unnecessary content such as practice, sound checks, etc., or other commands or parameters. The transcoded segment can also be assigned a bitrate to define the bitrate at which the segment is to be streamed.

The manifest processor 1118 can have associated therewith at least one transcode worker process. A transcode worker process can be a threaded process wherein each transcode worker includes a plurality of transcode worker threads 1120. The plurality of transcode worker threads 1120 can, for example, include threads to listen for new segment transcode request messages. The threads can be configured to process several new segment transcode request messages at a time up to a preconfigured thread pool size. The transcode worker threads 1120 are scaled according to current CPU availability. As CPU resources diminish, transcode worker threads are terminated, whereas, as more CPU resources become available, additional transcode worker threads can be created to handle additional transcoding operations. When the manifest processor 1118 receives a transcode request, the manifest processor 1118 retrieves the manifest 1112 and parses the manifest to determine the locations of the segments 1114 associated with the manifest 1112. In some embodiments, the transcode request can include the manifest 1112 in the request. For each segment 1114 parsed from the manifest 1112, the manifest processor 1118 publishes a transcode request that is processed by a transcode worker thread 1120. For example, if there are three segments 1114 to be transcoded, the manifest processor 1118 generates three transcode requests, one for each segment 1114, and three transcode worker threads 1120 each handle one of the transcode requests.

Each transcode worker thread 1120 then retrieves a segment 1114. The transcode worker thread 1120 that retrieved the segment can then start a new transcode worker thread 1120 to perform transcoding of the segment according to the parameters of the transcode request, and wait for the new transcode worker thread 1120 to complete the transcoding process. For instance, if the transcode request includes a command to transcode each segment 1114 for a particular media stream 1110 to be 1280×720 pixels, each transcode worker thread 1120 will transcode a segment 1114 to be 1280×720. The original transcode worker thread that retrieved the segment will then edit media headers and upload the media. A transcoded media stream 1122 is thus created and stored on the one or more servers 1106 that includes a new manifest 1124 and one or more transcoded segments 1126. Each transcode worker thread 1120 stores a transcoded segment 1126 on the one or more servers 1106, which is a transcoded version of the segment 1114 retrieved by one of the transcode worker threads. The manifest processor 1118 creates the new manifest 1124 and stores it on the one or more servers 1106. The manifest processor 1118 can create the new manifest 1124 periodically during the transcode process as one or more segments are successfully transcoded, or in some embodiments can create the new manifest 1124 after all segments 1114 have been transcoded by the transcode worker threads 1120. The new manifest 1124 can then be downloaded by the decoder 1104 and used to retrieve the transcoded segments 1126 in order to view or playback the content of the media stream 1122. In some embodiments, the manifest processor 1118 can create a new manifest for streaming using a different standard than that used for the original segments before transcoding. For example, original segments stored on the server after a media capture and encoding session may be in a common media format such as MP4 format, and may be originally stored to be streamed via DASH streaming, with a DASH manifest. The manifest processor 1118 can create a new manifest to be used in locating the same common media format segments. For instance, the manifest processor 1118 can create an HLS playlist that includes information pertaining to each of the segments, so that both DASH and HLS streaming can be offered to decoders. The same segments using the same media container can be streamed whether the client is using the DASH manifest or the HLS playlist.

In some embodiments, the decoder 1104 can be set to play content on a delay from the capture, encoding, and transmission of the content from the encoder 1102 to the one or more servers 1106. For example, if a live event is taking place and being recorded, encoded, segmented, uploaded to the server, and transcoded during the event, a delay may be set to provide for an amount of time (five minutes, twenty minutes, one hour, etc.) before decoders are allowed to retrieve and play the content. It should be understood that the new manifest 1124 can also include the locations of the original segments 1114, and other transcoded versions or representations of the segments 1114 and 1126 as well, to enable compatible decoders to retrieve segments at different bitrates during a stream using a single manifest as bandwidth for the decoder increases and decreases.

Figure 12:
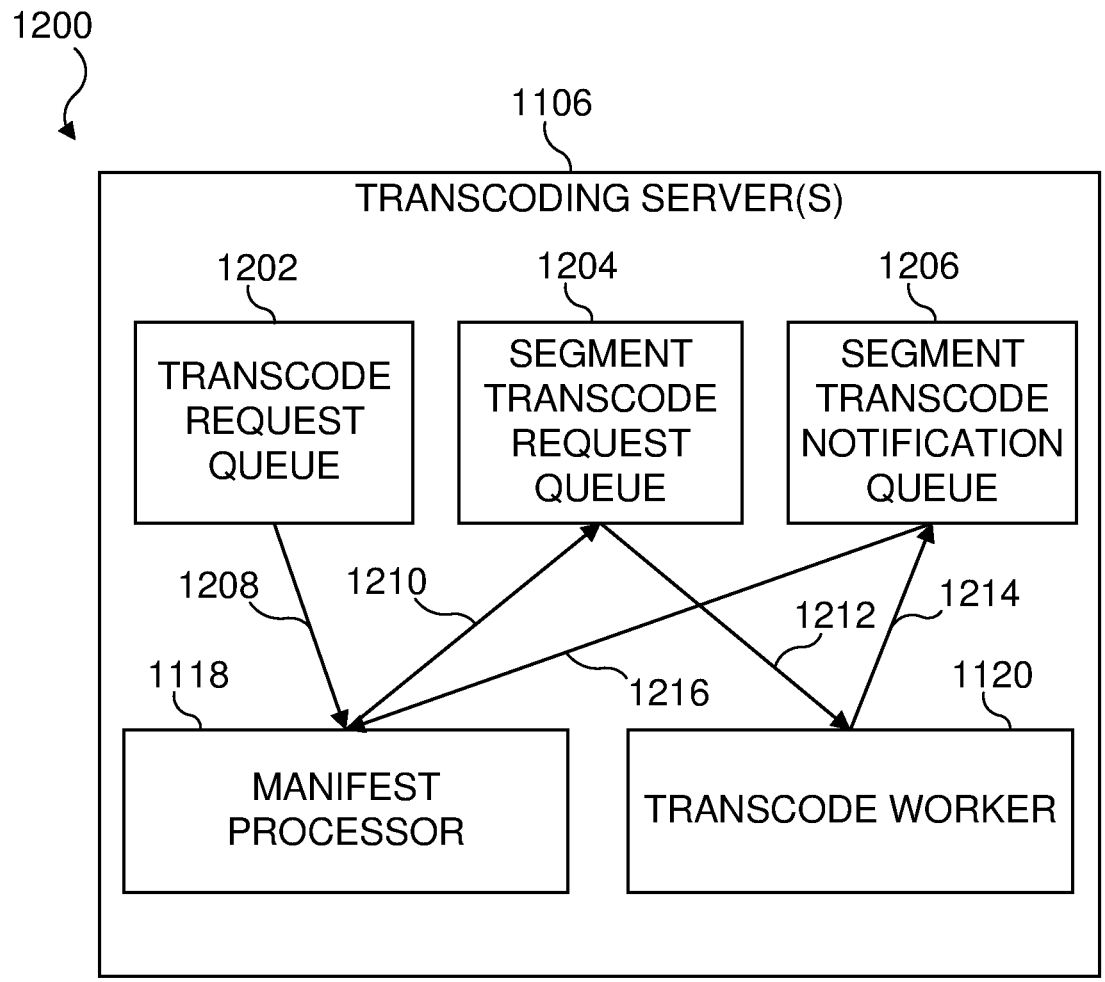
FIG. 12 illustrates a transcoding request message sequence in accordance with various embodiments of the present disclosure.

Referring now to FIG. 12, there is illustrated a transcoding request message sequence 1200 in accordance with various embodiments of the present disclosure. The one or more servers 1106 can include a messaging service that enables members of the system such as manifest processors 1118, transcode workers threads 1120, and other applications and modules to communicate. The messaging service can provide multiple message queues that are each associated with a specified function, so that members of the system such as the manifest processors 1118 and the transcode worker threads 1120 can monitor the queues for new messages that can include requests or commands such as transcode requests. The server thus provides a messaging bus between the queues and system processes such as the manifest processors 1118 and the transcode worker threads 1120. It will be understood that the various queues, manifest processors, and transcode workers can operate on a single server, or can be distributed across multiple servers as needed.

As illustrated in FIG. 12, a transcode request queue 1202 is provided by the one or more servers 1106. The transcode request queue 1202 receives and holds initial transcode requests for processing by a manifest processor 1118. One or more manifest processors 1118 can be running and actively monitoring the transcode request queue 1202. When a request is placed in the transcode request queue 1202, a manifest processor 1118 detects the presence of a request in the transcode request queue 1202 and retrieves the request from the queue 1202 at step 1208. The manifest processor 1118 analyzes the request to determine what the request requires. For instance, the request may specify that a particular data stream is to be transcoded for other bitrates or resolutions, transcoded to a different codec standard, or other operations such as resizing or cropping. The manifest processor 1118 then retrieves and parses the appropriate manifest to determine the location of the media segments associated with the data stream.

As each location is determined, the manifest processor 1118, at a step 1210, places a segment transcode request in a segment transcode request queue 1204. One or more transcode worker threads 1120 can be active and monitoring the segment transcode request queue 1204 for any new segment transcode requests. A transcode worker thread 1120, upon detecting the presence of a request in the segment transcode request queue 1204, retrieves the request from the queue at a step 1212. A transcode worker thread 1120 then performs the request in accordance with the parameters of the request. Once the request is complete, such as when the transcoder worker thread 1120 has completed transcoding a segment and stored the segment on the one or more servers 1106, at a step 1214 a transcode worker thread 1120 places a segment transcode notification in a segment transcode notification queue 1206. Manifest processors 1118 can also monitor the segment transcode notification queue 1206 for any new notifications and retrieve a notification at a step 1216. In some embodiments, the segment transcode request queue 1204 and the segment transcode notification queue 1206 are unique to a particular media stream and can be created for that stream when a manifest processor 1118 receives a transcode request, such that, for a particular media stream, one manifest processor subscribes to the segment transcode notification queue 1206. These notifications indicate to the manifest processor 1118 that the transcode operation for a segment is complete. The notification can also include a unique identifier (UID) that is associated with a data stream, so that the manifest processor 1118 can determine to which data stream the segment belongs. The manifest processor 1118 that retrieves the notification from the segment transcode notification queue 1206 may or may not be the same manifest processor 1118 that processed the transcode request from the transcode request queue 1202.

Upon receipt of the notification from the segment transcode notification queue 1206, the manifest processor creates a new manifest that includes the location on the server(s) for the newly transcoded segment and stores the new manifest on the server, replacing any other previously created manifests for the data stream. In some embodiments, manifest processors 1118 wait for an interval of time between each check of the segment transcode notification queue 1206. During this interval of time, messages received and stored in the segment transcode notification queue 1206 are merged. Once the interval of time expires, the manifest processor 1118 retrieves a single merged notification that may refer to more than one transcoded segment. The manifest processor 1118 then creates a new manifest that includes the storage location of every newly transcoded segment. This time interval allows for more than one segment to be included in the new manifest at a time, so that a new manifest is not written after every transcoded segment is created, reducing the amount of resources used by the server.

The queues 1202, 1204, and 1206 disclosed herein in some embodiments are queues created and maintained by a messaging service on the one or more servers 1106. The messaging service allows for sending and receiving messages between applications and processes. The messaging service can send messages over one or more message busses. For example, the messages and requests sent at steps 1208, 1210, 1212, 1214, and 1216 can each be sent over a message bus between the manifest processor 1118, the transcode worker threads 1120, and the queues 1202, 1204, and 1206, allowing for processes to operate on distributed devices so that if one process fails, another can take the first process' place, as described herein.

As described herein, the present disclosure provides for transcoding processes to be carried out during a live event. As such, the systems disclosed herein can be configured so that users view the content on a delay, to allow for time to transcode content, and to allow for time to reattempt transcode requests in the event of network issues, or if a manifest processor or a transcode worker fails. The system can be massively scaled in the cloud with active-active redundancy. Every threaded manifest processor and transcode worker can potentially work on any uploading stream at any time, such as any currently recording and uploading live event stream. If a manifest processor or transcode worker or thread dies, the remaining manifest processor, transcode worker, or associated threads can pick up where the dead one left off and absorb the additional workload. As the load increases, the number of processes and threads automatically increases, within allowance of available resources, to meet the demand.

Figure 13:
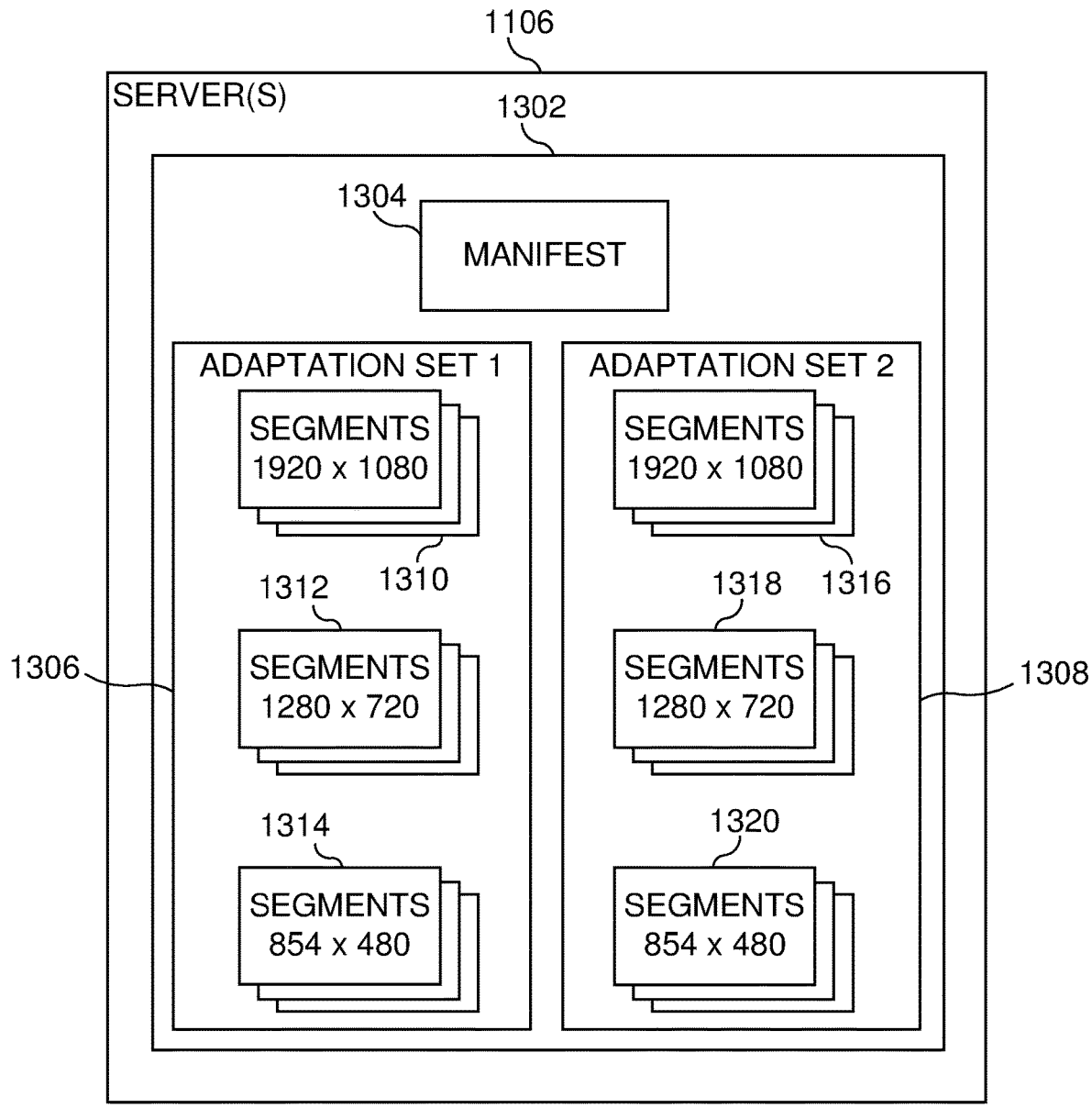
FIG. 13 illustrates media content stored on one or more servers that includes multiple adaptation sets and representations in accordance with various embodiments of the present disclosure.

Referring now to FIG. 13, there is illustrated media content 1302 stored on the one or more servers 1106 that includes multiple adaptation sets and representations in accordance with various embodiments of the present disclosure. The media content 1302 includes a manifest 1304 and a plurality of media segments divided into separate adaptation sets and representations. In the example illustrated in FIG. 13, there are two adaptation sets. Adaptation sets can include different components of a media stream. For example, one adaptation set may include audio segments for a stream while another adaptation set may include video segments. Separate adaptation sets can also be used for separating audio by language, with each language being in a separate adaptation set, while one common adaptation includes all video segments. Adaptation sets can also include other content such as subtitles or arbitrary metadata. In yet other examples, one adaptation set can include segments for one media stream where the video is at a particular angle, while another adaptation set includes segments for a media stream at a different angle. For example, if the media content 1302 includes video of a speaker on a stage with a visual aid on a screen elsewhere on the stage, one adaptation set can include video captured at an angle showing the speaker's face, while the other adaptation set includes video captured at an angle showing the visual aid. This can allow for a user viewing the content to switch between angles during viewing.

In the example illustrated in FIG. 13, there is stored on the one or more servers 1106 a first adaptation set 1306 and a second adaptation set 1308. The first adaptation set 1306 includes segments at various resolutions to accommodate variable bitrates. The first adaptation set 1306 includes a first representation 1310 at a resolution of 1920×1080, a second representation 1312 at a resolution of 1280×720, and a third representation 1314 at a resolution of 854×480. The second adaptation set 1308 similarly includes a first representation 1310 at a resolution of 1920×1080, a second representation 1312 at a resolution of 1280×720, and a third representation 1314 at a resolution of 854×480. The second adaptation set 1308 may however be a recording of an event at a different angle than that of the first representation. The manifest 1304 can include the locations of all the segments for each adaptation set and representation, allowing a decoder to use the manifest 1304 to retrieve different adaptation sets or different representations during a stream as needed by the client or as desired by the user. It should be understood that the adaptation sets and representations illustrated in FIG. 13 are but one example, and other adaptations and representations can be stored and streamed by the one or more servers 1106, such as representations that include different resolutions than those illustrated in FIG. 13, and adaptation sets that include content other than video content.

Figure 14:
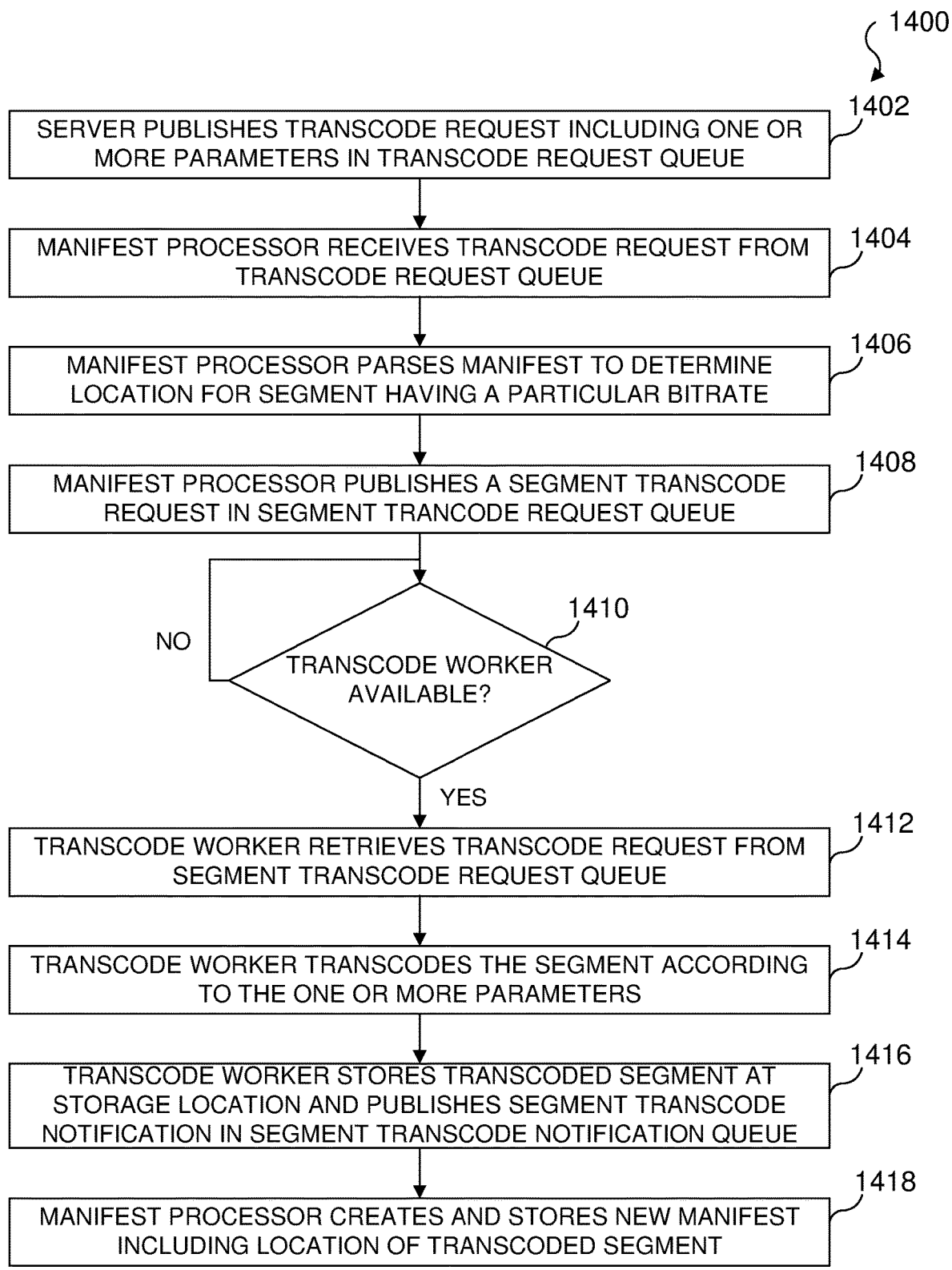
FIG. 14 illustrates a flowchart of a transcoding process in accordance with various embodiments of the present disclosure.

Referring now to FIG. 14, there is illustrated a flowchart of a transcoding process 1400 in accordance with various embodiments of the present disclosure. The process 1400 begins at step 1402. At step 1402, the one or more servers 1106 publishes a transcode request including one or more parameters in the transcode request queue 1202. At step 1404, the manifest processor 1118 receives the transcode request from the transcode request queue 1202. In some embodiments, the manifest processor 1118 may actively monitor the transcode request queue and retrieves the transcode request from the queue when the manifest processor 1118 detects that the transcode request is present in the transcode request queue 1202. In other embodiments, the transcode request may be pushed to an available manifest processor 1118.

At step 1406, the manifest processor 1118 parses the manifest to determine a location a segment, such as a URL or server location. The segment is stored for a particular bitrate or at a particular resolution. At step 1408, the manifest processor 1118 publishes a segment transcode request in the segment transcode request queue 1204. The segment transcode request is a request to transcode the segment that was located in step 1406 in accordance with the one or more parameters included in the transcode request received by the manifest processor 1118 in step 1404. For example, if the transcode request received by the manifest processor 1118 includes instructions to transcode the segments in the manifest from a resolution of 1920×1080 to 1280×720, the segment transcode request published in the segment transcode request queue 1204 at step 1408 includes a request to transcode the particular segment located in step 1406 using the manifest to 1280×720. The segment transcode request can also include the location of the segment located in step 1406 to allow for a transcode worker thread to retrieve the segment for transcoding.

At decision block 1410, if a transcode worker is available, the process flows to step 1412 where an available transcode worker retrieves the segment transcode request from the segment transcode request queue 1204. If at decision block 1410 a transcode worker is not available, the process loops until a transcode worker becomes available to process the segment transcode request in the segment transcode request queue 1204. It will be understood that the manifest processor 1118, after publishing a segment transcode request in the segment transcode request queue 1204, can continue to parse the manifest to locate a next segment to be transcoded, and publish another segment transcode request for the next segment in the segment transcode request queue 1204. As such, even if at decision block 1410 a transcode worker is not available to retrieve a segment transcode request from the segment transcode request queue, the manifest processor 1118 can continue parsing the manifest and publishing additional segment transcode requests to the segment transcode request queue. The segment transcode requests can then be processed as transcode workers become available to process each request.

After the transcode worker retrieves the segment transcode request from the segment transcode request queue 1204 at step 1412, the process flows to step 1414. At step 1414, the transcode worker transcodes the segment that is the subject of the segment transcode request according to the one or more parameters. Once the segment is transcoded, at step 1416 the transcode worker stores the transcoded segment at a storage location, such as on the one or more servers 1106. The transcode worker also publishes a segment transcode notification in the segment transcode notification queue 1206, indicating that the segment transcode request is complete. At this point, the transcode worker that performed the transcoding process at step 1414 is free to retrieve another segment transcode request from the segment transcode request queue 1204.

At step 1418, the manifest processor 1118 receives the segment transcode notification from the segment transcode notification queue 1206, which notifies the manifest processor 1118 that the segment transcode request is complete. The manifest processor 1118 then creates a new manifest that includes the location of the transcoded segment, and stores the new manifest at a storage location, such as on the one or more servers 1106. In some embodiments, the new manifest includes locations of transcoded segments created as a result of the transcode request received by the manifest processor 1118 at step 1404. In some embodiments, the new manifest includes the locations of the transcoded segments, as well as the original segments, so that the new manifest can be used during a media stream to allow a decoder to request different representations of the media to account for bandwidth and bitrates.

Figure 15:
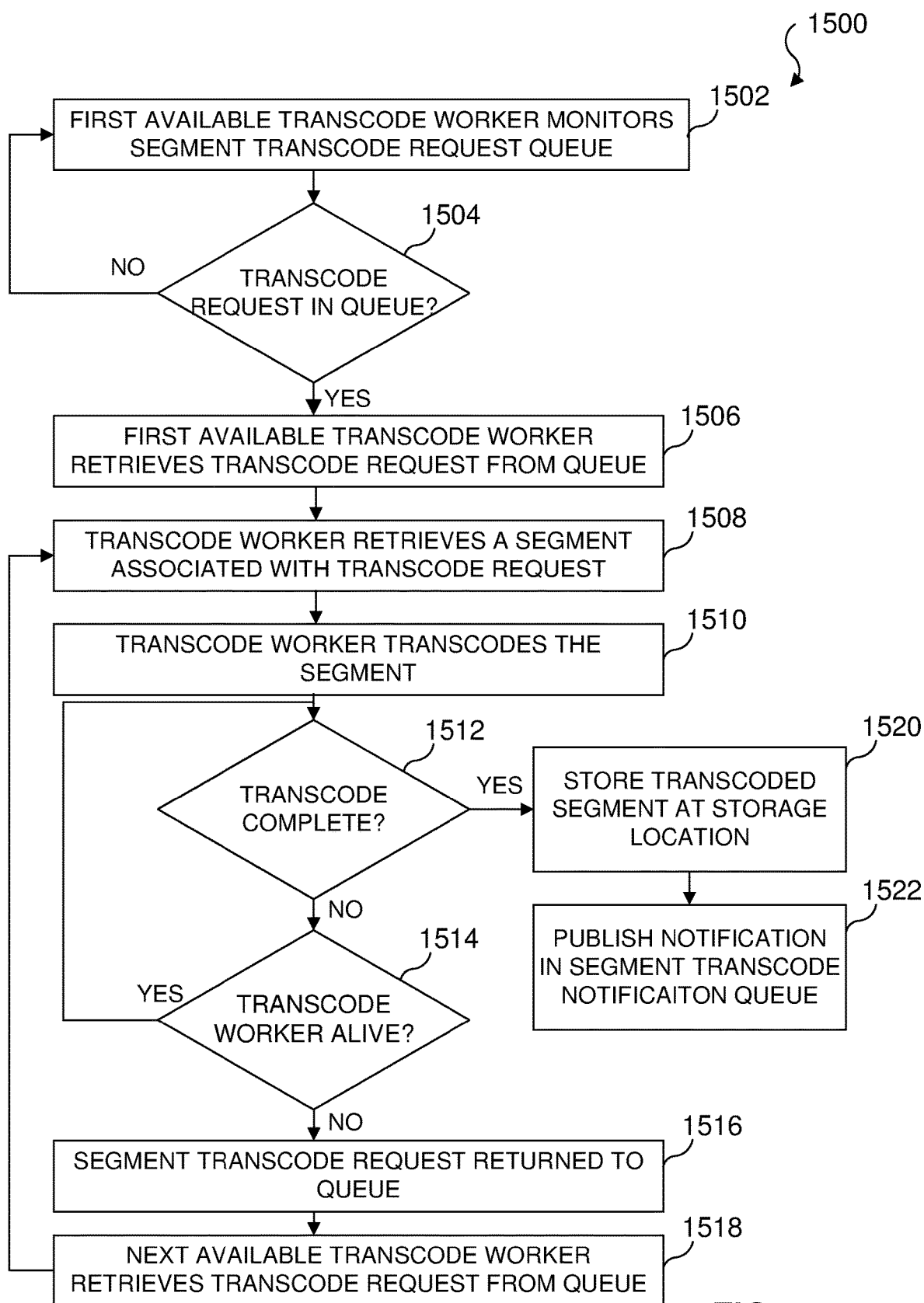
FIG. 15 illustrates a flowchart of a transcode worker process in accordance with various embodiments of the present disclosure.

Referring now to FIG. 15, there is illustrated a flowchart of a transcode worker process 1500 in accordance with various embodiments of the present disclosure. The process 1500 begins at step 1502. At step 1502, a first available transcode worker monitors the segment transcode request queue 1204. One or more transcode workers can be monitoring the queue at a time. In some embodiments, a priority system may be implemented so that multiple transcode workers do not attempt to retrieve a segment transcode request from the segment transcode request queue 1204 at the same time. At decision block 1504, the first available transcode worker determines if a segment transcode request is in the segment transcode request queue 1204. If not, the process 1500 moves back to step 1502 and the first available transcode worker continues to monitor the segment transcode request queue 1204. If so, the process 1500 moves to step 1506.

At step 1506 the first available transcode worker retrieves the segment transcode request from the segment transcode request queue 1204. At step 1508, the transcode worker retrieves a segment identified in the segment transcode request retrieved at step 1506. At step 1510, the transcode worker begins transcoding the segment. At decision block 1512, it is determined whether the transcode is complete. If not, at decision block 1514, the manifest processor 1118 can determine if the transcode worker that retrieved the segment transcode request at step 1506 is still alive or running. If so, the process 1500 moves back to decision block 1512 to determine if the transcoding is complete. In some embodiments, the manifest processor 1118 can record which segments identified in the manifest have been successfully transcoded. After publishing a segment transcode request, the manifest processor 1118 can periodically check whether the segment transcode request is complete, and, if not, if the transcode worker thread 1120 responsible for completing the transcoding process for the segment is still running.

If at decision block 1514 it is determined that the transcode worker is not running, the process 1500 moves to step 1516. At step 1516, the segment transcode request that was being handled by the transcode worker that has stopped running is returned to the segment transcode request queue 1204 so that another transcode worker can attempt to finish transcoding the segment. At step 1518, a next available transcode worker retrieves a segment transcode request from the segment transcode request queue 1204. In some embodiments, the failed segment transcode request is placed back in the end of the segment transcode request queue 1204, such that the next available transcode worker retrieves the next segment transcode request in the segment transcode request queue 1204, whether that request is the previously failed one or not. In other embodiments, the failed segment transcode request is placed at the front of the segment transcode request queue 1204, prioritizing the failed segment transcode request over other requests in the queue. In yet other embodiments, the failed segment transcode request is placed into a reattempt queue that is a separate queue from the segment transcode request queue 1204. The reattempt queue can be periodically checked by a transcode worker to reattempt a transcode process on a segment while other transcode workers process requests from the segment transcode requests queue 1204. In some embodiments, requests in the reattempt queue are not processed until a transcode worker detects that the segment transcode request queue 1204 is empty.

After the failed transcode request is returned to a queue at step 1516 and the next available transcode worker retrieves a segment transcode request from the queue, the process 1500 moves back to step 1508 where the next available transcode worker retrieves the segment to be transcoded. The process then moves again to step 1510 where the transcode worker begins transcoding the segment. If at decision block 1512 the transcode process is completed, the process 1500 moves to step 1520. At step 1520, the transcode worker stores the transcoded segment at a storage location, such as on the one or more servers 1106. At step 1522, the transcode worker publishes in the segment transcode notification queue 1206 a notification that transcoding of the segment is complete, which is used to notify the manifest processor 1118 that transcoding of the segment is complete and to prompt the manifest processor 1118 to create a new manifest that includes information pertaining to the transcoded segment.

Figure 16:
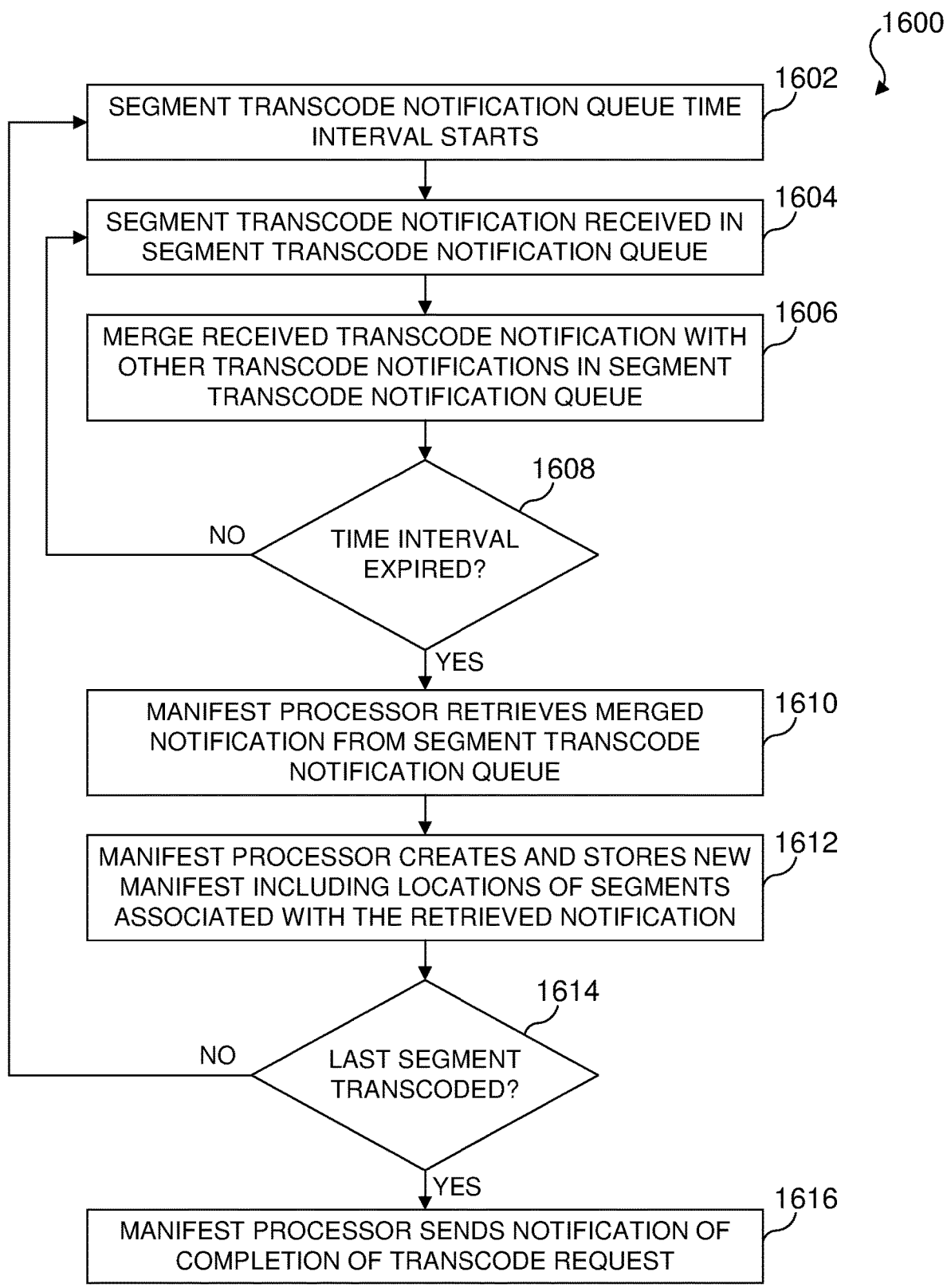
FIG. 16 illustrates a flowchart of a segment transcode notification merging process in accordance with various embodiments of the present disclosure.

Referring now to FIG. 16, there is illustrated a flowchart of a segment transcode notification merging process 1600 in accordance with various embodiments of the present disclosure. The process 1600 begins at step 1602 where a segment transcode notification queue time interval or rate limit starts. This time interval can be maintained by the manifest processor 1118 to coordinate when the manifest processor 1118 checks the segment transcode notification queue 1206. Since multiple transcode workers can be transcoding segments, storing transcoded segments, and publishing segment transcode notifications to the segment transcode notification queue 1206 at the same time, the time interval can be used so that the manifest processor 1118 is not retrieving just one segment transcode notification at a time and creating a new manifest for every notification. Rather, segment transcode notifications can be accumulated in the segment transcode notification queue 1206 during the time interval. Notifications accumulated during the time interval can be merged into one notification so that the manifest processor 1118 can create a new manifest that includes each transcoded segment in the merged notification, reducing the resources required than if the manifest processor 1118 created a new manifest every time a transcoded segment was completed.

During the time interval started at step 1602, the manifest processor 1118 does not attempt to check the segment transcode notification queue 1206. At step 1604, a segment transcode notification is received in the segment transcode notification queue and from a transcode worker, indicating that a segment has been transcoded. At step 1606, the segment transcode notification is merged with other segment transcode notifications in the queue. If the queue already contains a merged notification, the segment transcode notification is merged with the merged notification to create a new merged notification. At decision block 1608, the manifest processor 1118 determines if the timer interval started at step 1602 has expired. If not, the process 1600 moves back to step 1604. While the time interval is not expired, additional segment transcode notifications can be received by the segment transcode notification queue 1206 from transcode workers, repeating steps 1604 and 1606 to receive new notification and merge the new notifications into one merged notification.

If at decision block 1608 the time interval has expired, the process moves to step 1610. At step 1610, the manifest processor 1118 retrieves the merged notification from the segment transcode notification queue. At step 1612, the manifest processor 1118 creates a new manifest that includes the locations of all segments identified in the merged notification, and stores the new manifest at a storage location. In some embodiments, segment transcode notifications may not be merged, but the manifest processor 1118 can still retrieve every notification currently in the segment transcode notification queue 1206 and create a new manifest that includes information pertaining to the segments identified in the notifications. At decision block 1614, the manifest processor 1118 determines whether the last segment has been transcoded. If not, the process moves back to step 1602 where another time interval starts. If so, the process moves to step 1616. At step 1616, the manifest processor sends a notification of completion of the transcode request on the server, indicating that all segments associated with a media content has been transcoded in fulfillment of the transcode request originally received by the manifest processor 1118.

Figure 17:
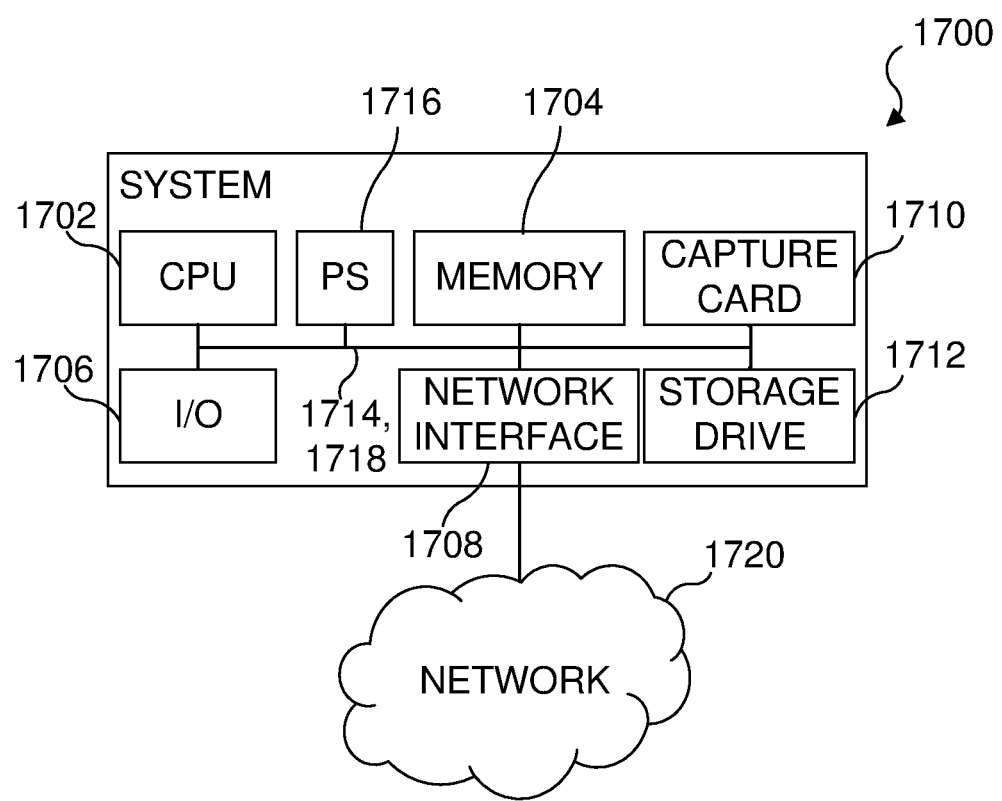
FIG. 17 illustrates a diagrammatic view of a device that may be used within the systems disclosed herein in accordance with various embodiments of the present disclosure.

Referring to FIG. 17, an electronic device 1700 is illustrated in accordance with various embodiments of the present disclosure. The device 1700 is one example of a portion or all of the encoder 106 and/or the decoder 112 of FIG. 1, as well as potentially other clients, servers, encoders, and decoders described in FIG. 1 and in other embodiments. The system 1700 includes a controller (e.g., a processor/central processing unit ("CPU")) 1702, a memory unit 1704, an input/output ("I/O") device 1706, and at least one network interface 1708. The device 1700 includes at least one network interface 1708, or network interface controllers (NICs). In embodiments that include more than one network interface 1708, the additional network interfaces 1708 allow for a different network service provider to be switched to in the event of a network issue. For instance, if one network interface 1708 is connected to the Internet via a connection provided by a first Internet service provider, and that connection encounters an issue or fails, another network interface 1708 that is connected via a connection provided by a second Internet service provider may take over. The device 1700 further includes at least one capture card 1710 for capturing media, such as video or audio data. The device 1700 also includes a storage drive 1712 used for storing content captured by the at least one capture card 1710. The components 1702, 1704, 1706, 1708, 1710, and 1712 are interconnected by a data transport system (e.g., a bus) 1714. A power supply unit (PSU) 1716 provides power to components of the system 1700 via a power transport system 1718 (shown with data transport system 1714, although the power and data transport systems may be separate).

It is understood that the system 1700 may be differently configured and that each of the listed components may actually represent several different components. For example, the CPU 1702 may actually represent a multi-processor or a distributed processing system; the memory unit 1704 may include different levels of cache memory, and main memory; the I/O device 1706 may include monitors, keyboards, and the like; the at least one network interface 1708 may include one or more network cards providing one or more wired and/or wireless connections to a network 1720; and the storage drive 1712 may include hard disks and remote storage locations. Therefore, a wide range of flexibility is anticipated in the configuration of the system 1700, which may range from a single physical platform configured primarily for a single user or autonomous operation to a distributed multi-user platform such as a cloud computing system.

The system 1700 may use any operating system (or multiple operating systems), including various versions of operating systems provided by Microsoft (such as WINDOWS), Apple (such as Mac OS X), UNIX, and LINUX, and may include operating systems specifically developed for handheld devices (e.g., iOS, Android, Blackberry, and/or Windows Phone), personal computers, servers, and other computing platforms depending on the use of the system 1700. The operating system, as well as other instructions (e.g., for telecommunications and/or other functions provided by the device 1700), may be stored in the memory unit 1704 and executed by the processor 1702. For example, if the system 1700 is the device 1700, the memory unit 1704 may include instructions for performing some or all of the steps, process, and methods described herein.

The network 1720 may be a single network or may represent multiple networks, including networks of different types, whether wireless or wired. For example, the device 1700 may be coupled to external devices via a network that includes a cellular link coupled to a data packet network, or may be coupled via a data packet link such as a wide local area network (WLAN) coupled to a data packet network or a Public Switched Telephone Network (PSTN). Accordingly, many different network types and configurations may be used to couple the device 1700 with external devices.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "interface," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   accessing, by one or more processors, media content;
   compressing, by the one or more processors, the media content;
   segmenting, by the one or more processors, the compressed media content into compressed content segments;
   encrypting, by the one or more processors, the compressed content segments; and
   uploading, by the one or more processors, the encrypted compressed content segments to a server configured to provide one or more of the encrypted compressed content segments to a decoder disallowed from playing any of the uploaded encrypted compressed content segments until expiration of a predetermined delay measured from provision of the encrypted compressed content segments by the server to the decoder.

2. The method of claim 1, wherein:
   the decoder is disallowed from downloading any of the uploaded encrypted compressed content segments until the expiration of a further predetermined delay measured from the uploading of the encrypted compressed content segments.

3. The method of claim 1, wherein:
   the predetermined delay during which the decoder is disallowed from playing any of the uploaded encrypted compressed content segments is set by a user of the decoder.

4. The method of claim 1, wherein:
   the decoder is configured to initiate playback of one or more of the uploaded encrypted compressed content segments after the expiration of the predetermined delay.

5. A system comprising:
   one or more processors; and
   a memory storing instructions that, when executed by at least one processor among the one or more processors, cause the system to perform operations comprising:
   accessing media content;
   compressing the media content;
   segmenting the compressed media content into compressed content segments;
   encrypting the compressed content segments; and
   uploading the encrypted compressed content segments to a server configured to provide one or more of the encrypted compressed content segments to a decoder disallowed from playing any of the uploaded encrypted compressed content segments until expiration of a predetermined delay measured from provision of the encrypted compressed content segments by the server to the decoder.

6. The system of claim 5, wherein:
   the decoder is disallowed from downloading any of the uploaded encrypted compressed content segments until the expiration of a further predetermined delay measured from the uploading of the encrypted compressed content segments.

7. The system of claim 5, wherein:
   the predetermined delay during which the decoder is disallowed from playing any of the uploaded encrypted compressed content segments is set by a user of the decoder.

8. The system of claim 5, wherein:
   the decoder is configured to initiate playback of one or more of the uploaded encrypted compressed content segments after the expiration of the predetermined delay.

9. A non-transitory machine-readable medium comprising instructions that, when executed by one or more processors of a machine, cause the machine to perform operations comprising:
   accessing media content;
   compressing the media content;
   segmenting the compressed media content into compressed content segments;
   encrypting the compressed content segments; and
   uploading the encrypted compressed content segments to a server configured to provide one or more of the encrypted compressed content segments to a decoder disallowed from playing any of the uploaded encrypted compressed content segments until expiration of a predetermined delay measured from provision of the encrypted compressed content segments by the server to the decoder.

10. The non-transitory machine-readable medium of claim 9, wherein:
    the decoder is disallowed from downloading any of the uploaded encrypted compressed content segments until the expiration of a further predetermined delay measured from the uploading of the encrypted compressed content segments.

11. The non-transitory machine-readable medium of claim 9, wherein:
    the predetermined delay during which the decoder is disallowed from playing any of the uploaded encrypted compressed content segments is set by a user of the decoder.

12. The non-transitory machine-readable medium of claim 9, wherein:

the decoder is configured to initiate playback of one or more of the uploaded encrypted compressed content segments after the expiration of the predetermined delay.

* * * * *

UNITED STATES PATENT AND TRADEMARK OFFICE
CERTIFICATE OF CORRECTION

| | |
|---|---|
| PATENT NO. | : 11,936,923 B1 |
| APPLICATION NO. | : 17/858033 |
| DATED | : March 19, 2024 |
| INVENTOR(S) | : Reitmeyer et al. |

Page 1 of 1

It is certified that error appears in the above-identified patent and that said Letters Patent is hereby corrected as shown below:

On the Title Page

On page 3, in Column 2, item (56) under "Other Publications", Line 25, delete "Mulitmedia" and insert --Multimedia-- therefor On page 3, in Column 2, item (56) under "Other Publications", Line 28, delete "Mulitmedia" and insert --Multimedia-- therefor On page 3, in Column 2, item (56) under "Other Publications", Line 31, delete "Mulitmedia" and insert --Multimedia-- therefor In the Specification In Column 6, Line 66, delete "102" and insert --104-- therefor Signed and Sealed this
Thirty-first Day of December, 2024

Derrick Brent
*Acting Director of the United States Patent and Trademark Office*